(12) United States Patent
Hamada

(10) Patent No.: US 8,213,787 B2
(45) Date of Patent: Jul. 3, 2012

(54) CAMERA SYSTEM AND IMAGE FORMING APPARATUS

(75) Inventor: Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/916,764

(22) Filed: Nov. 1, 2010

(65) Prior Publication Data

US 2011/0110656 A1 May 12, 2011

(30) Foreign Application Priority Data

Nov. 9, 2009 (KR) .................. 10-2009-0107515

(51) Int. Cl.
*G03B 3/10* (2006.01)
(52) U.S. Cl. ...................................... 396/133
(58) Field of Classification Search .................. 396/133
See application file for complete search history.

(56) References Cited

U.S. PATENT DOCUMENTS

| 5,911,086 | A | * | 6/1999 | Miyazawa et al. | 396/96 |
| 6,018,631 | A | * | 1/2000 | Taniguchi et al. | 396/79 |
| 7,787,043 | B2 | * | 8/2010 | Moriya | 348/335 |
| 2008/0199170 | A1 | | 8/2008 | Shibuno et al. | |
| 2009/0185799 | A1 | * | 7/2009 | Kawarada | 396/125 |
| 2009/0262235 | A1 | * | 10/2009 | Kawazoe et al. | 348/345 |
| 2010/0060781 | A1 | * | 3/2010 | Yumiki et al. | 348/345 |

FOREIGN PATENT DOCUMENTS

JP 2007-079204 A 3/2007
JP 2008-015274 A 1/2008

* cited by examiner

*Primary Examiner* — Rodney Fuller
(74) *Attorney, Agent, or Firm* — Drinker Biddle & Reath LLP

(57) ABSTRACT

A camera system includes a replaceable lens and a body unit in which the replaceable lens is installed, and an image forming apparatus, in which a timer included in a lens controller is reset according to an instruction from a camera controller so that the replaceable lens is synchronized with the body unit, and focus is adjusted using location information detected by the replaceable lens and a focus estimation value calculated by the body unit.

18 Claims, 20 Drawing Sheets

|  e1 |  e2 |  e3 |  e4 |  e5 |
|-----|-----|-----|-----|-----|
|  e6 |  e7 |  e8 |  e9 | e10 |
| e11 | e12 | e13 | e14 | e15 |

AFareaL8[1]

AFareaL8[a]

e8

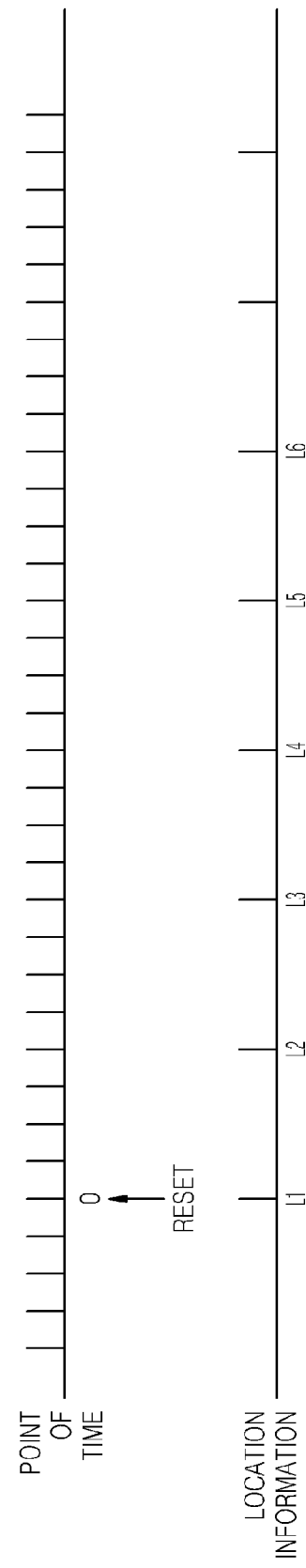

CAMERA SYSTEM AND IMAGE FORMING APPARATUS

CROSS-REFERENCE TO RELATED PATENT APPLICATION

This application claims the benefit of Korean Patent Application No. 10-2009-0107515, filed on Nov. 9, 2009, in the Korean Intellectual Property Office, the disclosure of which is incorporated herein in its entirety by reference.

BACKGROUND

The invention relates to a camera system including a replaceable lens, and an image forming apparatus.

A camera system including a replaceable lens may use a contrast auto focusing (AF) method in order to adjust a focal point. The contrast AF method may include calculating an AF estimation value with respect to an image signal generated by an imaging device, detecting the focal point from the AF estimation value and then driving a focus lens.

In detail, in the contrast AF method, a point of time at which the imaging device captures an image corresponds to a lens location. In addition, a point of time at which an AF estimation value is maximized is detected from changes in the AF estimation value generated from image signals that are continuously generated. An AF operation is performed by calculating a lens location corresponding to the detected point of time and then driving a lens to the calculated lens location.

SUMMARY

The invention provides a camera system and an image forming apparatus, for performing a precise auto focusing (AF) operation and reducing the size and manufacturing cost of a camera. Various embodiments are discussed below.

According to an embodiment, there is provided a camera system including a replaceable lens and a body unit in which the replaceable lens is installed, wherein the replaceable lens includes a focus lens for changing a focal point location; a driver for driving the focus lens; a detector for detecting a location of the focus lens; and a lens controller including a timer for measuring a point of time, wherein the lens controller transmits information corresponding to the detected location of the focus lens to the body unit, wherein the body unit includes an imaging device for capturing light transmitted through the replaceable lens and for generating an image signal; an imaging-device controller for generating a timing signal and for controlling the imaging device to capture the light in synchronization with the timing signal; and a camera controller for performing auto focusing (AF) detection on the image signal to calculate an AF estimation value, for storing the AF estimation value for each of respective AF detection time according to the timing signal, for calculating the focal point location by using location information transmitted from the replaceable lens and the stored AF estimation value, and for transmitting the result of the calculation to the replaceable lens, and wherein the lens controller transmits the information corresponding to the location of the focus lens to the body unit asynchronously with the timing signal.

The lens controller may transmit the information corresponding to the location of the focus lens when the location of the focus lens changes, or when a request for the information corresponding to the location of the focus lens is performed by the camera controller.

The body unit and the replaceable lens may communicate with each other, and the camera controller may transmit an instruction for resetting the timer to the lens controller.

The camera system may further include a communication pin disposed between the body unit and the replaceable lens, wherein the communication pin may be set to operate in real time communication.

In the replaceable lens, timing at which the information corresponding to the location of the focus lens is stored may be asynchronous with the timing signal.

A frequency at which the replaceable lens transmits the information corresponding to the location of the focus lens may be greater than a frequency of the timing signal.

According to another embodiment, there is provided a camera system including a replaceable lens and a body unit in which the replaceable lens is installed, wherein the replaceable lens includes a focus lens for changing a focal point location; a driver for driving the focus lens; a detector for detecting a location of the focus lens; and a controller including a timer being capable of adjusting a time-measurement period, wherein the controller transmits information corresponding to the detected location of the focus lens to the body unit, and wherein the body unit includes an imaging device for capturing light transmitted through the replaceable lens and for generating an image signal; an imaging-device controller for generating a timing signal and for controlling the imaging device to capture the light in synchronization with the timing signal; and a camera controller for performing auto focusing (AF) detection on the image signal to calculate an AF estimation value, for storing the AF estimation value for each of respective AF detection time according to the timing signal, for calculating the focal point location by using location information transmitted from the replaceable lens and the stored AF estimation value, and for transmitting the result of the calculation to the replaceable lens.

The lens controller may transmit the information corresponding to the location of the focus lens when the location of the focus lens changes, or when a request for the information corresponding to the location of the focus lens is performed by the camera controller.

The body unit and the replaceable lens may communicate with each other, and the camera controller may transmit an instruction for resetting the timer and information regarding the time-measurement period to the lens controller. The time-measurement period of the timer may be smaller than a period of the AF detection.

The time-measurement period of the timer may be the same as a period of the timing signal.

The camera system may further include a communication pin disposed between the body unit and the replaceable lens, wherein the communication pin may be set to operate in real time communication.

In the replaceable lens, timing at which the information of the location of the focus lens is stored may be asynchronous with the timing signal.

A frequency at which the replaceable lens transmits the information corresponding to the location of the focus lens may be greater than a frequency of the timing signal.

According to another embodiment of the invention, there is provided a camera system including a replaceable lens and a body unit in which the replaceable lens is installed, wherein the replaceable lens includes a focus lens; and a driver for driving the focus lens, wherein the body unit includes an imaging device for capturing light transmitted through the replaceable lens and for generating an image signal; an imaging-device controller for controlling the imaging device to capture the light; and a camera controller for calculating an AF estimation value from the image signal, and for performing an AF operation by which an operation of the replaceable lens and an operation of the body unit are synchronized with each other, wherein the camera system further includes a communication pin that communicates between the replaceable lens and the body unit, and wherein the communication pin is changeable between real time communication for synchronizing the operation of the replaceable lens and the operation of the body unit with each other and non-real time communication.

The replaceable lens may include a timer for synchronization with the body unit, wherein, when the communication pin is in a real time communication state, the replaceable lens may reset the timer.

The camera controller may transmit to the replaceable lens an instruction for converting the communication pin from a real time communication state to a non-real time communication state.

According to another embodiment of the invention, there is provided a camera system including a replaceable lens and a body unit in which the replaceable lens is installed, wherein the replaceable lens includes a focus lens; a driver for driving the focus lens; and a timer for measuring a point of time, wherein the body unit includes an imaging device for capturing light transmitted through the replaceable lens and for generating an image signal; an imaging-device controller for controlling the imaging device to capture the light; and a camera controller for calculating an AF estimation value from the image signal, and for performing an AF operation, wherein the camera system further includes a communication pin for communicating between the replaceable lens and the body unit, and wherein the camera controller resets the timer via the communication pin.

The communication pin may be changeable between real time communication and non-real time communication.

According to another embodiment of the invention, there is provided an image forming apparatus including a replaceable lens and a body unit in which the replaceable lens is installed, the imaging forming apparatus including a focus part for changing a focal point location; a first controller including a part for measuring a point of time, wherein the first controller transmits information of location of the focus part to the body unit; an imaging device for generating an image signal; a second controller for generating a predetermined timing signal and for interworking of operation of the imaging device and the timing signal; and a third controller for calculating a focal point location by calculating an estimation value of a focal point for each information of the location of the focus part with respect to the image signal, wherein the first controller transmits the information of the location of the focus part to the body unit asynchronously with the timing signal of the second controller.

BRIEF DESCRIPTION OF THE DRAWINGS

The above and other features and advantages of the invention will become more apparent by describing in detail exemplary embodiments thereof with reference to the attached drawings in which:

FIG. 13 is a timing diagram of an AF operation for a lens, according to an embodiment of the invention;

DETAILED DESCRIPTION

The invention will now be described more fully with reference to the accompanying drawings, in which exemplary embodiments of the invention are shown.

Configuration and Operation of Camera System

Figure 1:
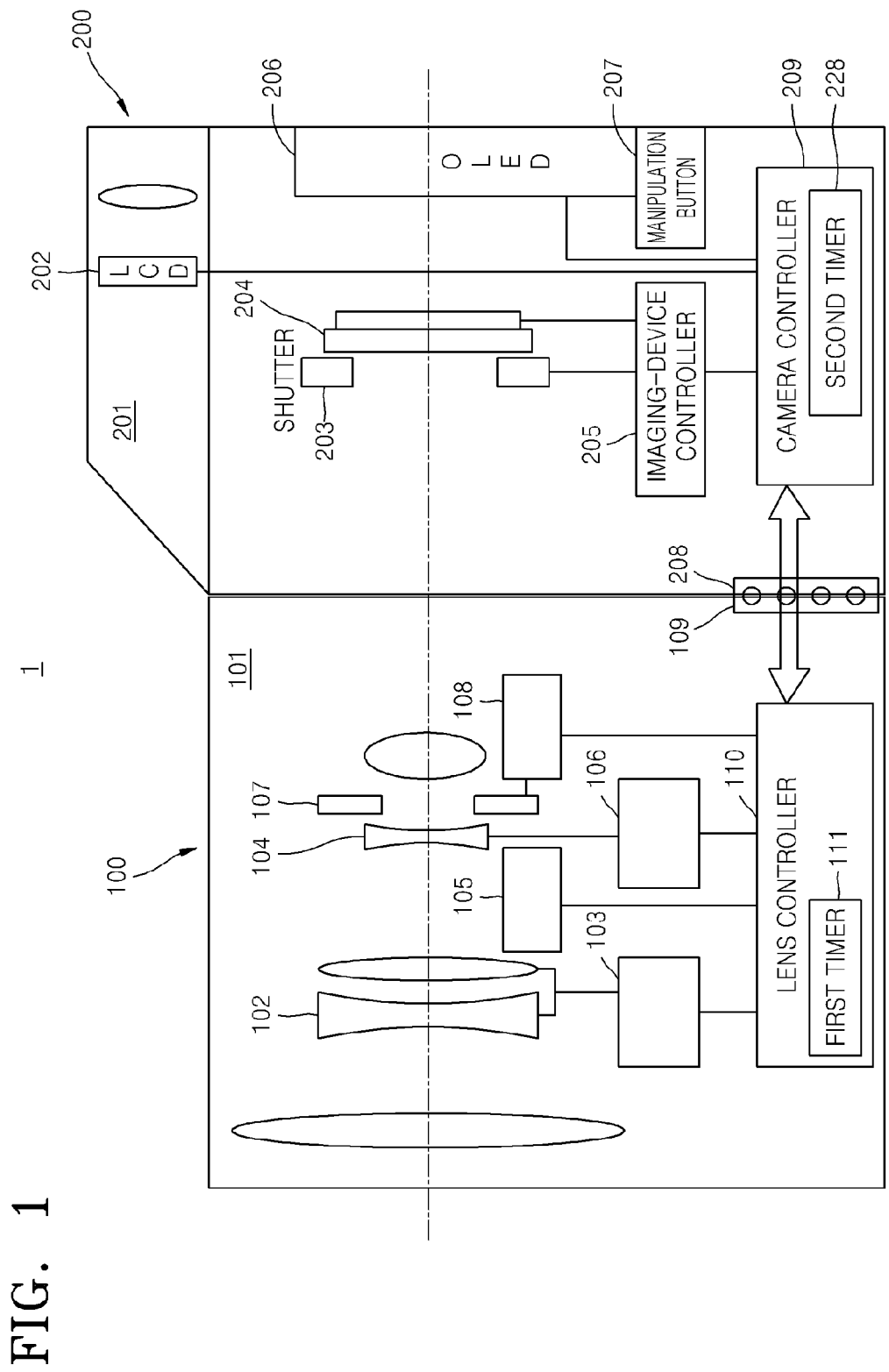
FIG. 1 is a block schematic diagram of a camera system according to an embodiment of the invention.

FIG. 1 is a diagram of a camera system 1 according to an embodiment of the invention.

Referring to FIG. 1, the camera system 1 includes a replaceable lens 100 (hereinafter "lens") and a body unit 200. The lens 100 performs a focal-point detecting function. The body unit 200 performs a function by which the lens 100 drives a focus lens 104.

The lens 100 includes an imaging optical system 101, a zoom lens location detecting sensor 103, a lens driving actuator 105, a focus lens location detecting sensor 106, an aperture driving actuator 108, a lens controller 110, and a lens mount 109.

The imaging optical system 101 includes a zoom lens 102 for performing a zooming operation, the focus lens 104 for changing a focal point location, and an aperture 107. The zoom lens 102 and the focus lens 104 may each be configured as a lens group including a plurality of lenses.

The zoom lens location detecting sensor 103 and the focus lens location detecting sensor 106 detect a location of the zoom lens 102 and a location of the focus lens 104, respectively. The focus lens location detecting sensor 106 may be an example of a location detector.

The lens driving actuator 105 and the aperture driving actuator 108 are controlled by the lens controller 110 to drive the focus lens 104 and the aperture 107, respectively. In particular, the lens driving actuator 105 drives the focus lens 104 along an optical axis. The lens driving actuator 105 may be an example of a driver of the focus lens 104.

The lens controller 110 may include a first timer 111 for measuring a point of time. In addition, the lens controller 110 transmits location information corresponding to the location of the focus lens 104 to the body unit 200. In this case, the lens controller 110 may transmit the location information corresponding to the focus lens 104 to the body unit 200 when the location of the focus lens 104 changes, or when a camera controller 209 requests the lens controller 110 to transmit the location information corresponding to the focus lens 104.

The lens mount 109 includes a communication pin of a lens side.

Next, configuration of the body unit 200 will be described.

The body unit 200 may include an electronic view finder (EVF) 201, a shutter 203, an imaging device 204, an imaging-device controller 205, a display unit 206, manipulation buttons 207, the camera controller 209 and a camera mount 208.

The EVF 201 may include a liquid crystal display (LCD) unit 202. Thus, via the EVF 201, a user may view an image that is being captured, in real time.

The shutter 203 determines a period of time that light is applied to the imaging device 204, that is, an exposure time.

The imaging device 204 is an example of a photoelectric transformation element, and captures image light corresponding to a subject transmitted through the imaging optical system 101 of the lens 100 to generate an image signal. A charge coupled device (CCD) sensor or a complementary metal oxide semiconductor (CMOS) sensor may be used as the imaging device 204.

The imaging-device controller 205 generates a timing signal, and controls the imaging device 204 to capture an image in synchronization with the timing signal.

The display unit 206 is for displaying various images and various pieces of information. An organic light-emitting device (OLED) may be used as the display unit 206.

The manipulation buttons 207 are for inputting various user commands in order to manipulate the camera system 1. The manipulation buttons 207 may include various buttons such as a shutter release button, a main switch, a mode dial and a menu button.

The camera controller 209 performs auto focusing (AF) detection on the image signal generated by the imaging device 204 to calculate an AF estimation value. In addition, the camera controller 209 stores the AF estimation value for each of respective AF detection time according to the timing signal generated by the imaging-device controller 205, and calculates a focal point by using the location information transmitted from the lens 100 and the stored AF estimation value for each of the AF detection time. The result of the calculation of the focal point is transmitted to the lens 100. The camera controller 209 may include a second timer 228 for measuring a point of time.

The camera mount 208 includes a communication pin of a camera side.

The communication pin of the lens mount 109 and the communication pin of the camera mount 208 are disposed corresponding to each other. Various commands and various pieces of data are transmitted through the communication pins.

Hereinafter, schematic operations of the lens 100 and the body unit 200 will be described.

When a subject is to be photographed, operating of the camera system 1 is started by manipulating the main switch of the manipulation buttons 207. First, the camera system 1 performs live-view display as follows.

Image light from the subject transmitted through the imaging optical system 101 is incident on the imaging device 204. In this case, the shutter 203 is in an open state. The incident image light is converted into an image signal by the imaging device 204. The imaging device 204 operates according to the timing signal generated by the imaging-device controller 205. The generated image signal is converted into data that is displayable by the camera controller 209, and is output to the EVF 201 and the display unit 206. This operation is the live-view display, and live-view images displayed during the live-view display are consecutively displayed as a moving picture.

While the live-view images are displayed, the camera system 1 starts an AF operation when the shutter release button of the manipulation button 207 is pressed halfway (S1 operation). The AF operation is performed using the image signal generated by the imaging device 204. In a contrast AF method, the focal point is calculated from the AF estimation value calculated by the camera controller 209, which is related to a contrast value, and the lens 100 is driven based on the result of the calculation. The camera controller 209 calculates information for controlling the focus lens 104 from the AF estimation value, and transmits the information to the lens controller 110 via the communication pin of the lens mount 109 and the communication pin of the camera mount 208.

The lens controller 110 controls the lens driving actuator 105, based on the received information, and drives the focus lens 104 along the optical axis to perform the AF operation. The focus lens location detecting sensor 106 monitors the location of the focus lens 104 to perform feedback control on the location of the focus lens 104.

When the zoom lens 102 is zoomed by user's manipulation, the zoom lens location detecting sensor 103 detects the location of the zoom lens 102, and the lens controller 110 changes AF control parameters of the focus lens 104 to perform the AF operation again.

When a subject image is in complete focus by the above-described operation, the shutter release button of the manipulation buttons 207 is pressed fully (S2 operation) so that the camera system 1 performs an exposure operation. In this case, the camera controller 209 closes the shutter 203 completely, and transmits photometry information as aperture control information to the lens controller 110, wherein the photometry information has been obtained so far. The lens controller 110 controls the aperture driving actuator 108, based on the aperture-control information, and the aperture 107 is narrowed according to an appropriate aperture value. The camera controller 209 controls the shutter 203 according to the photometry information, and opens the shutter 203 for an appropriate exposure time to photograph the subject and capture the subject image.

An image signal process and a compression process are performed on the captured subject image, and the processed subject image is stored in a memory card. The captured subject image is output on the EVF 201 and the displaying unit 206, which simultaneously display the subject image. The subject image may be referred to as a quick view image.

A series of photograph operations is completed by the above-described operations.

Configuration and Operation of Camera Controller

Figure 2:
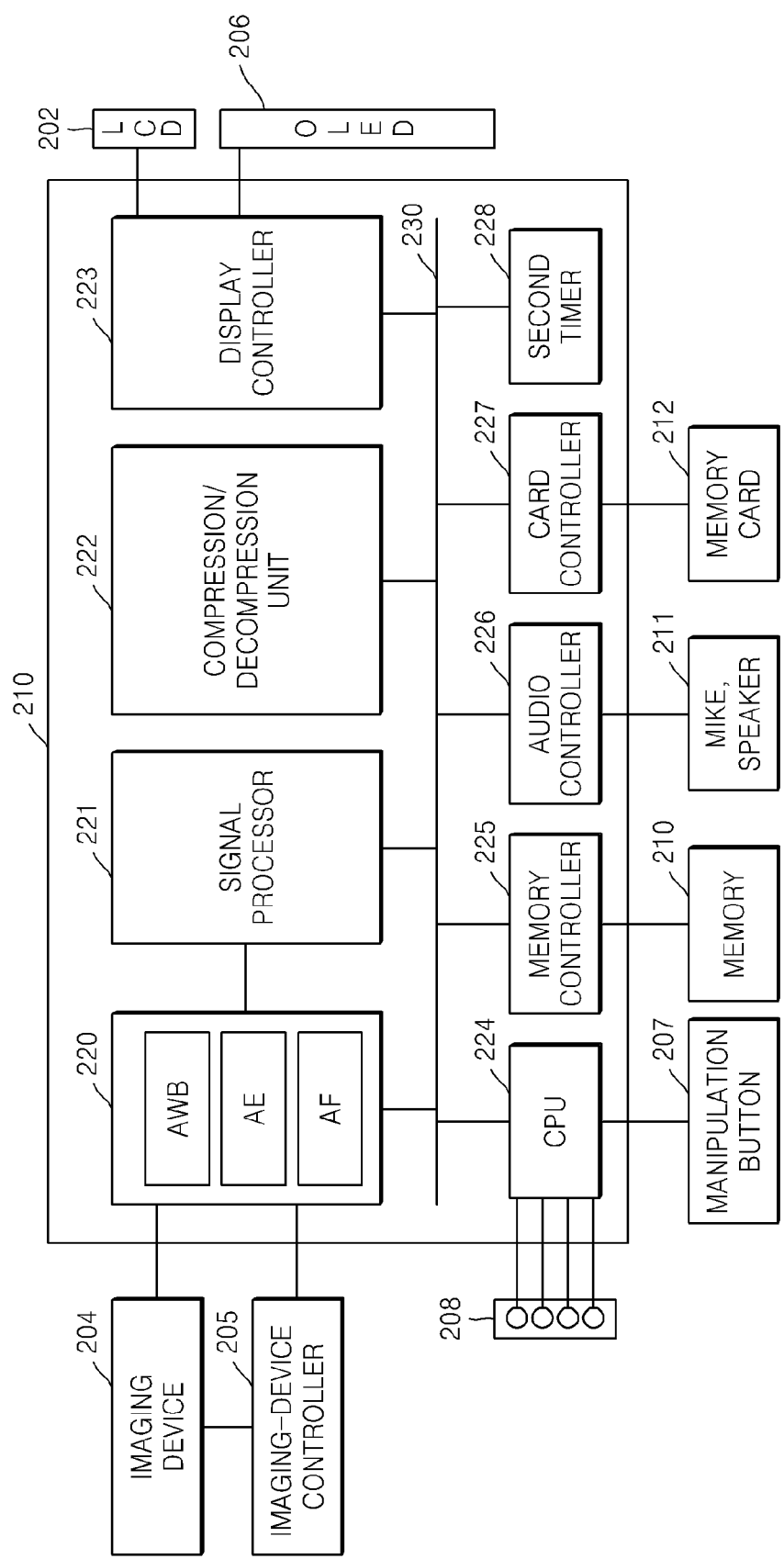
FIG. 2 is a block diagram showing a camera controller according to an embodiment of the invention.

FIG. 2 shows the camera controller 209 according to an embodiment of the invention.

Referring to FIG. 2, the camera controller 209 may include a preprocessor 220, a signal processor 221, compression/decompression unit 222, a display controller 223, a central processing unit (CPU) 224, a memory controller 225, an audio controller 226, a card controller 227, the second timer 228 and a main bus 230.

The camera controller 209 transmits various commands and various pieces of data to each of elements connected to the main bus 230. The preprocessor 220 receives an image signal generated by the imaging device 204 and performs auto white balance (AWB), auto exposure (AE) and AF calculations. That is, the preprocessor 220 calculates the AF estimation value for determining the focal point, an AE estimation value for adjusting exposure, and an AWB estimation value for adjusting white balance.

The signal processor 221 creates a live-view image or a captured image that is capable of being displayed on the display unit 206 by performing a series of image signal processing operations such as gamma correction.

The compression/decompression unit 222 performs compression and decompression on the processed image signal. In a case of compression, the image signal is compressed according to a compression format, for example, JPEG or H.264. An image file including image data generated by the compression is transmitted to and stored in a memory card 212.

The display controller 223 controls the LCD 202 of the EVF 201 and a display screen of the display unit 206 to output images on the LCD 202 and the display screen.

The CPU 224 controls overall operations, and communicates with the lens 100.

The memory controller 225 controls a memory 210 for temporally storing data such as a captured image or associated information, and controls a mike or speaker 211. The card controller 227 controls the memory card 212 in which the captured image may be stored.

The second timer 228 is simultaneously reset with the first timer 111 to measure a point of time.

Hereinafter, a schematic operation of the camera controller 209 will be described.

When the CPU 224 detects that the manipulation button 207 is manipulated, the CPU 224 operates the imaging-device controller 205 through the preprocessor 220. The imaging-device controller 205 outputs a timing signal to operate the imaging device 204. When an image signal is input to the preprocessor 220 from the imaging device 204, the AWB and AE calculations are performed. The results of the AWB and AE calculations are transmitted to the imaging-device controller 205 as feedback so that an image signal corresponding to appropriate color output and appropriate exposure may be obtained from the imaging device 204.

When the camera system 1 begins to operate, the live-view display described above is performed. The camera controller 209 inputs the image signal corresponding to appropriate exposure to the preprocessor 220 to calculate the AE estimation value, or the like. An image signal for the live-view display is applied directly to the signal processor 221 without passing through the main bus 230. An image signal process such as pixel interpolation is performed on the image signal. The processed image signal is transmitted through the main bus 230 and the display controller 223 to be displayed on the LCD 202 and the display unit 206. The live-view display is updated at a period of 60 frames per second (fps). This updating period is set by the CPU 224 according to photometry information or AF conditions. In addition, the updating may be performed by changing the timing signal output by the imaging-device controller 205.

When the shutter release button is pressed halfway (S1 operation), the CPU 224 detects input of a half-press signal, and instructs the lens controller 110 to start driving of the focus lens 104 in order to perform an AF operation via the communication pin of the camera mount 208 and the communication pin of the lens mount 109.

The CPU 224 obtains the image signal from the imaging device 204. The preprocessor 220 calculates the AF estimation value. The AF estimation value is calculated according to movement of the focus lens 104. A location of the focus lens 104 in which the AF estimation value is maximized, that is, in which contrast of the subject image is maximized, is calculated from changes in the AF estimation value, and the focus lens 104 is moved to the calculated location. This series of operations is an AF operation, and the live-view display is continuously performed during the AF operation. The image signal used for the live-view display is the same as an image signal used to calculate the AF estimation value.

In the AF operation, the communication pin of the camera mount 208 and the communication pin of the lens mount 109 are used for communication between the lens 100 and the body unit 200. The communication pins may normally operate in serial communication in order to transmit lens information or control information. However, a time delay occurs in serial communication. AF control of the AF operation may not be correctly performed when the location information corresponding to the focus lens 104 determined according to the AF estimation value is recorded in the presence of a time delay. In order to reduce time taken for the body unit 200 to notify the lens 100 of timing for obtaining the AF estimation value or for transmitting the location information corresponding to the focus lens 104 from the lens 100 to the body unit 200, the time delay due to serial communication has to be reduced relatively greatly compared to a moving speed of the focus lens 104. However, it is not realistic to extremely reduce the time delay due to serial communication. Thus, a communication pin for synchronization may be considered. However, when a communication pin is used for synchronization only, the number of communication pins is increased and thus sizes of the camera mount 208 and the lens mount 109 and manufacturing costs are increased. Thus, according to the present embodiment, a timer function for synchronization between the lens 100 and the body unit 200 is used. In addition, after a predetermined communication pin is first set to operate in real time communication, and the timer function of the lens 100 is reset in real time communication, the predetermined communication pin is set to operate in serial communication, that is, non-real time communication.

The location of the focus lens 104 in which contrast of the subject image is maximized, that is, the peak of the AF estimation value, may be calculated according to changes in the location of the focus lens 104 at which the imaging device 204 obtains image signals and corresponding changes in the AF estimation value.

Figures 3, 4:
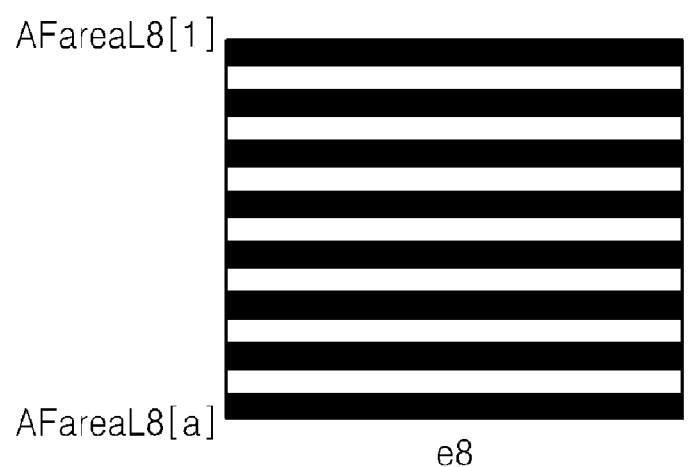
FIG. 3 pictorial diagram showing locations of multipoint auto focusing (AF) regions, according to an embodiment of the invention.
FIG. 4 is a pictorial diagram showing scan lines in a region, according to an embodiment of the invention.

FIG. 3 shows locations of multiple AF regions, according to an embodiment of the invention. The multiple AF regions are set on a central portion of a photograph screen, wherein the multiple AF regions are made up of 15 AF regions that are symmetrically disposed in horizontal and vertical directions. Image signals from the imaging device 204 are sequentially output horizontally from a top portion of the AF region to a bottom portion thereof in every line of a horizontal direction. That is, the image signals from the imaging device 204 are sequentially arranged from horizontally from a first scan line to an $n^{th}$ scan line. The image signals of the first scan line to the $n^{th}$ scan line are sequentially output.

Hereinafter, a method of calculating the location of the focus lens 104 at which contrast of the subject image is maximized, according to embodiments of the invention, will be described.

First Embodiment

With reference to FIGS. 4 through 8, a method of calculating the location of the focus lens 104 at which contrast of the subject image is maximized, according to an embodiment of the invention, will be described.

FIG. 4 shows scan lines in a region e8, according to an embodiment of the invention.

With regard to the region e8, that is, an AF region located in the center of the multiple AF regions of the photograph screen of FIG. 3, the region e8 includes a plurality of scan lines AFareaL8[1] to AFareaL8[a]. According to the present embodiment, a case where AF detection is performed on the e8 region is exemplified.

Operation of Lens

Figure 5:
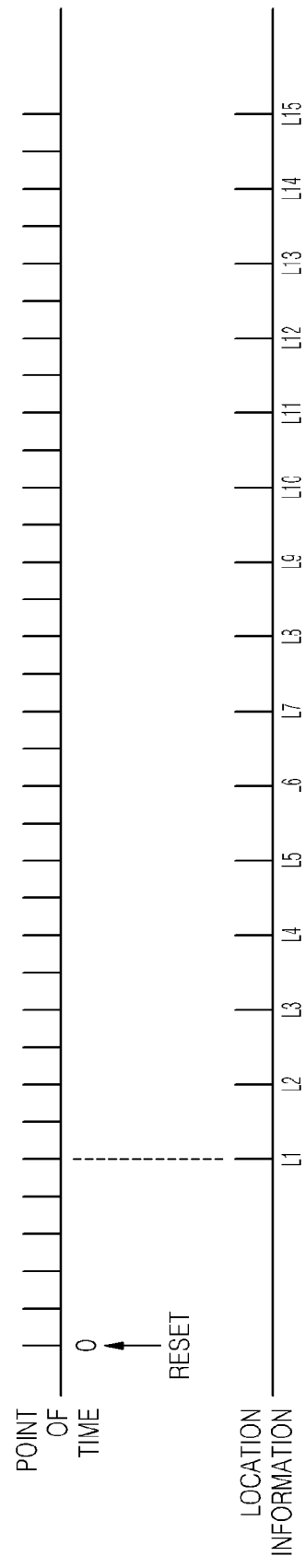
FIG. 5 is a timing diagram of an AF operation for a lens, according to an embodiment of the invention.

FIG. 5 is a timing diagram of the AF operation for the lens 100, according to an embodiment of the invention.

The lens controller 110 having a timer function resets the first timer 111 according to commands from the camera controller 209 to have the same reference point of time as a reference point of time of a camera. The lens controller 110 stores location information detected by the focus lens location detecting sensor 106 at a frequency corresponding to a predetermined period of time. The predetermined period of time may be, for example, 4 ms, but is not limited thereto and may be a period of time smaller than 16.67 ms (for cases in which the image device is driven at a framerate of 60 fps), that is, smaller than the periodicity at which the imaging device 204 generates image signals. The location information corresponding to timing of L1, L2, . . . and L15 is stored in memory.

Operation of Body Unit

Figure 6:
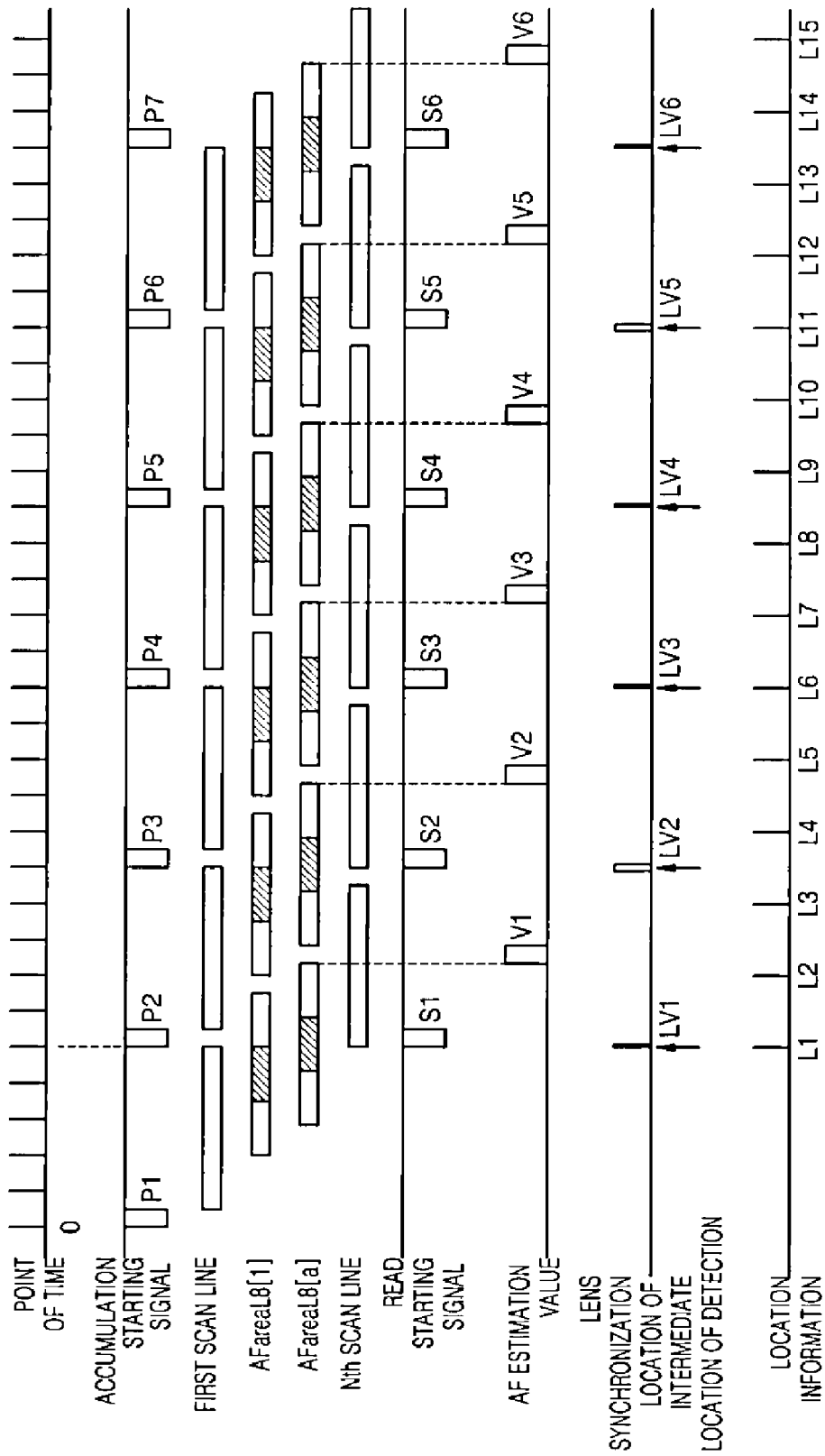
FIG. 6 is a timing diagram of an AF operation for a body unit corresponding to the lens of FIG. 5, according to an embodiment of the invention.

FIG. 6 is a timing diagram of the AF operation for the body unit 200 corresponding to the lens 100 of FIG. 5, according to an embodiment of the invention.

The body unit 200 includes the second timer 228, which may be reset to have the same reference point of time as the lens 100. When the second timer 228 is reset, a signal requesting reset is transmitted to the lens 100. The signal is transmitted from the body unit 200 to the lens 100 by using signal terminals of the lens mount 109 and the camera mount 208, that is, pins operating in real time communication from among other communication pins. The signal terminals operating in real time communication may then be used in serial communication.

Referring to FIG. 6, a plurality of timing diagrams of accumulation starting signals, charge accumulation signals of the first scan line, charge accumulation signals of the scan lines AFareaL8[1] to AFareaL8[a] on which AF detection is performed, charge accumulation signals of the $n^{th}$ scan line and read starting signals of the image signals are sequentially illustrated from top to bottom. In addition to the timing diagrams, timing for calculating the AF estimation value, lens synchronization locations corresponding to intermediate points of time of AF detection and the location information of the lens 100 corresponding to the lens synchronization locations are illustrated. The read starting signals are generated whenever the charge accumulation signal of the first scan line is finished. An AF estimation value V1 is calculated after a predetermined time delay required for calculation from when the charge accumulation signals of AFareaL8[1] to AFareaL8[a] are finished. While the operations are being repeated and while the focus lens 104 moves continually at a predetermined speed, AF estimation values V2 to V6 are calculated.

It is assumed that timing for obtaining the image signal used for AF detection in the region e8, which is an AF region, is an intermediate point of time of charge accumulation times of AFareaL8[1] to AFareaL8[a]. That is, an intermediate point of time between an starting time of the charge accumulation signal of AFareaL8[1] and an finishing time of the charge accumulation signal of AFareaL8[a] is assumed to be the timing for obtaining the image signal. In addition, the location of the focus lens 104 may be detected at the timing.

Detection of Peak Value of AF Estimation Value

Figure 7:
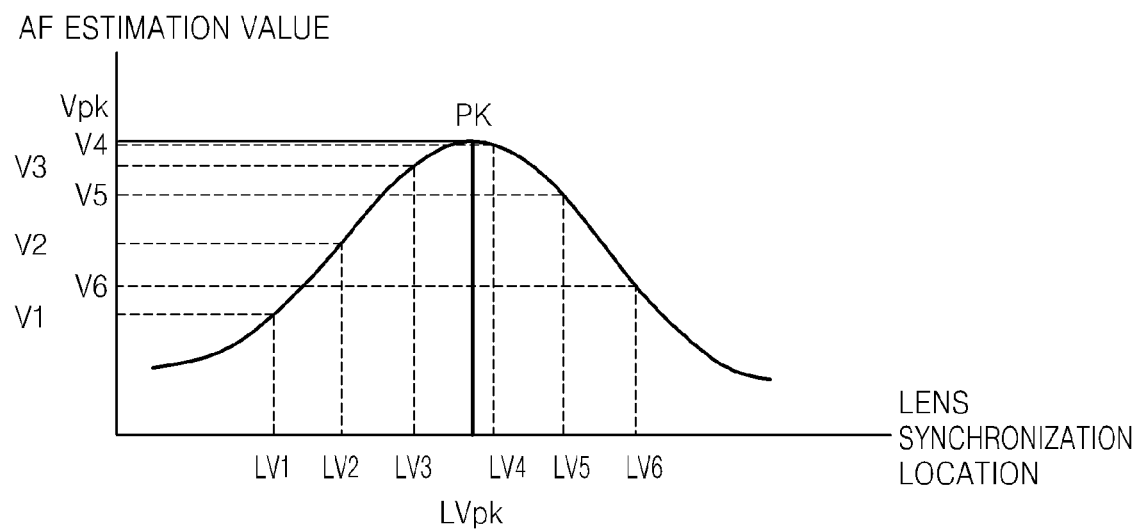
FIG. 7 is a graph for explaining a method of detecting a peak value of an AF estimation value in a contrast AF method, according to an embodiment of the invention.

FIG. 7 is a graph for explaining a method of detecting a peak value of an AF estimation value in a contrast AF method, according to an embodiment of the invention.

As described above, in the contrast AF method, a focal point is detected by detecting the peak value of the AF estimation value from changes in the AF estimation value. In FIG. 7, the horizontal axis is lens synchronization location, and the vertical axis is the AF estimation value. With regard to an AF estimation value V1 corresponding to a lens synchronization location LV1, an AF estimation value V2 corresponding to a lens synchronization location LV2, etc., the changes in the AF estimation value are shown in FIG. 7.

Since the AF estimation values are discrete, an actual peak location may be detected by performing an interpolation calculation on the AF estimation values. The actual peak location corresponds to a lens synchronization location LVpk and an actual peak value thereof is an AF estimation value Vpk, and location and value thereof correspond to a point PK. The interpolation calculation used to detect the peak value may be performed using three pieces of data, for example, LV3, LV4 and LV5, and AF estimation values V3, V4 and V5 corresponding to LV3, LV4 and LV5, respectively. In this case, the timing for obtaining an image signal used to detect the AF estimation values may correspond to the lens synchronization locations. In FIG. 6, an intermediate point of time of the charge accumulation times of AFareaL8[1] to AFareaL8[a], that is, a detection intermediate point of time, corresponds to timing for obtaining the image signal used to detect the AF estimation values. Thus, the detection intermediate point of time may correspond to the lens synchronization locations LV1, LV2, etc. In addition, the subject image may be in complete focus by moving the lens 100 to a location corresponding to the detected peak value, that is, the lens synchronization location LVpk.

The camera controller 209 may receive location information of the lens 100 based on the reference point of time of the first timer 111 included in the lens 100. By matching the reference point of time of the first timer 111 with that of the second timer 228, the location information stored in memory corresponding to the timing of the lens synchronization locations LV1, LV2, etc. may be obtained. Like LV1 and L1 of FIG. 6, the lens synchronization location may be matched with the timing of the stored location information. Like LV2 of FIG. 6, the lens synchronization location may be not matched with the timing of the location information stored in memory. Thus, in a case of LV2, the lens synchronization location may be obtained by an interpolation calculation from the location information corresponding to timing of L3 and L4, and stored points of time.

The AF operation may be performed by obtaining the peak value of contrast of the subject image from the lens synchronization location and the AF estimation value obtained as described above. Hereinafter, the AF operation in the lens 100 and the body unit 200 will be described in detail.

Method of Driving Camera System

Figure 8A:
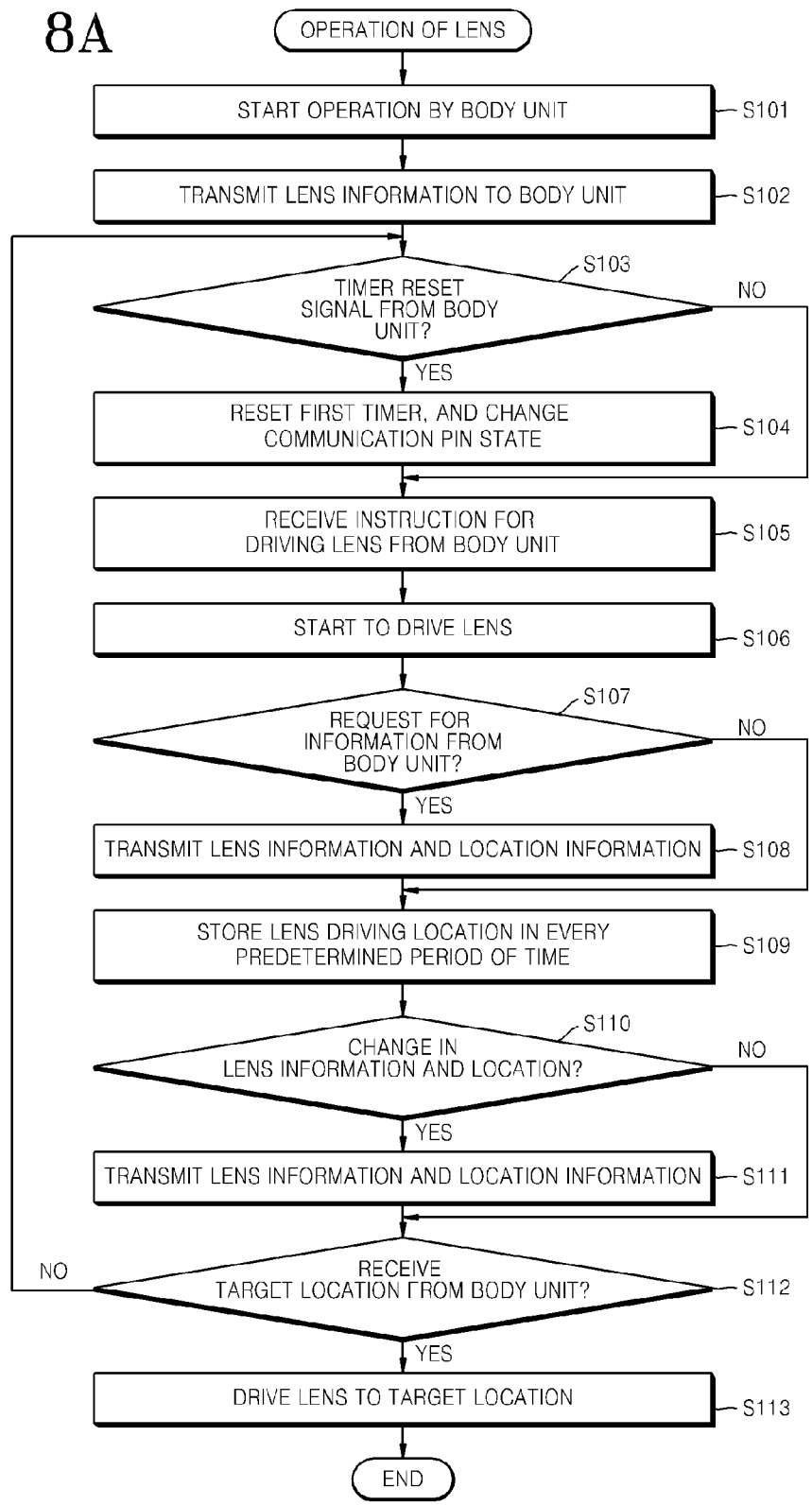
FIG. 8A through FIG. 8C are flowcharts illustrating a method of driving a camera system including the lens of FIG. 4 and the body unit of FIG. 5, according to an embodiment of the invention.
Figure 8B:
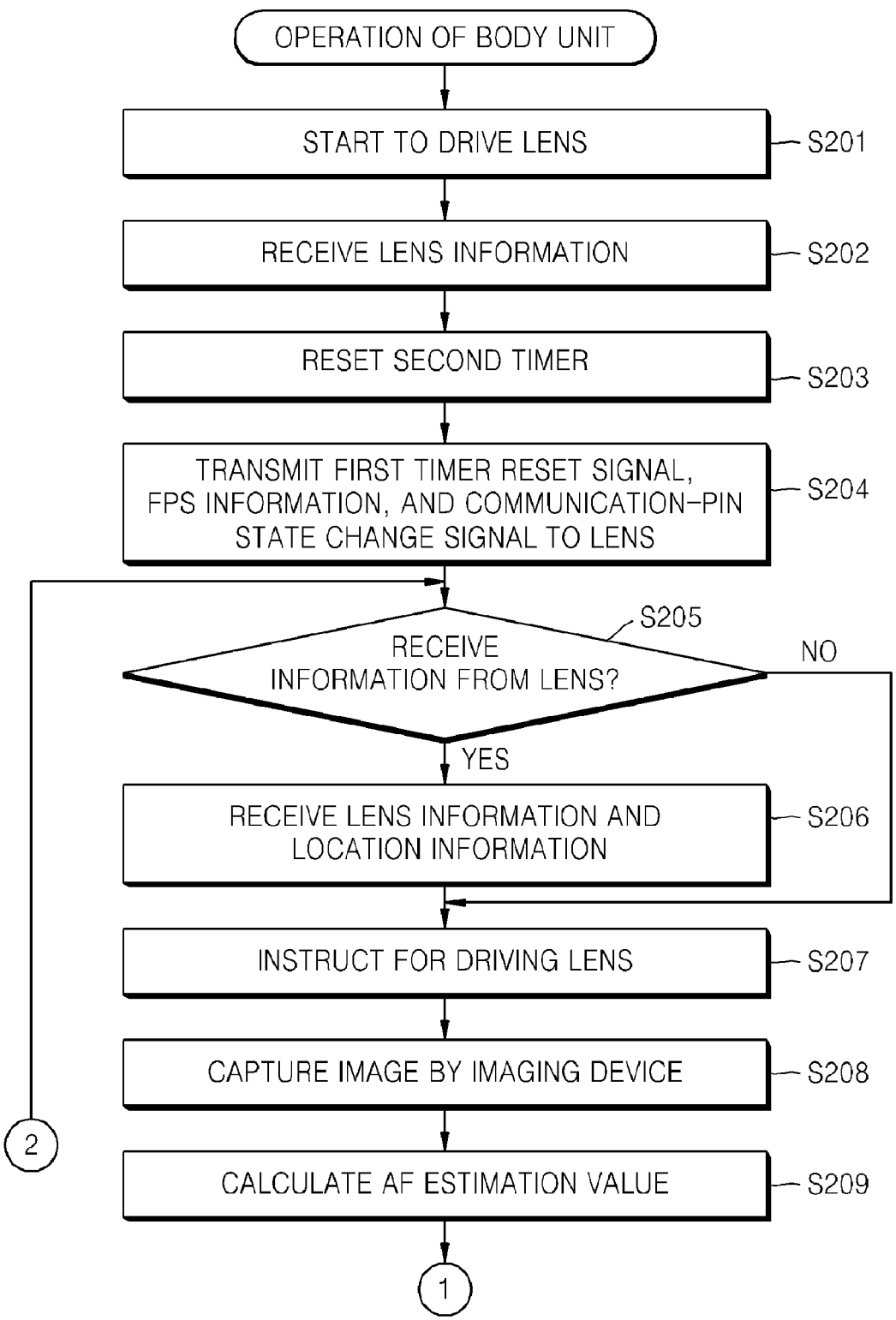
Figure 8C:
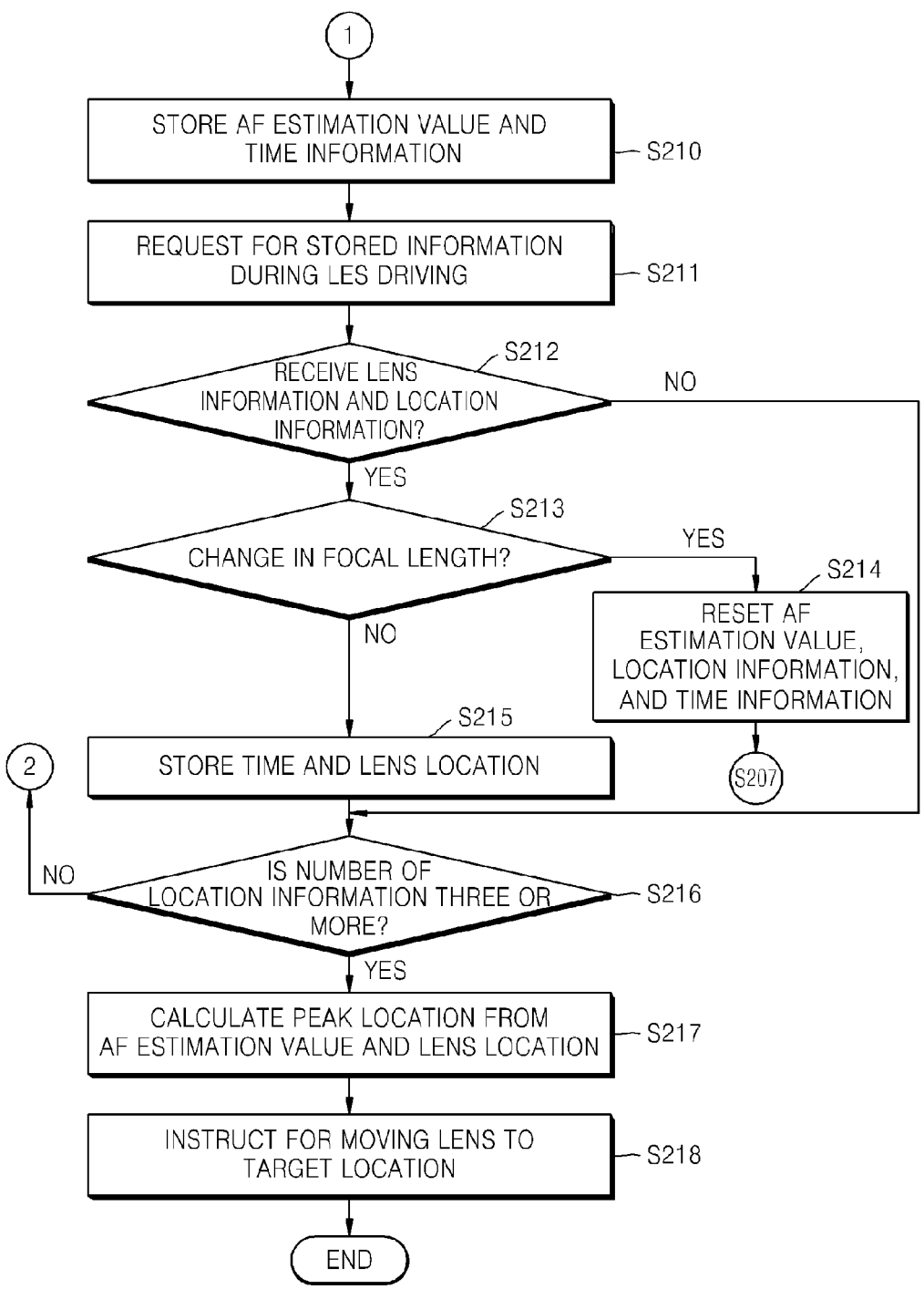

FIG. 8A through FIG. 8C are flowcharts illustrating a method of driving the camera system 1 of FIGS. 4 and 5, according to an embodiment of the invention.

First, an operation of the lens 100 will be described.

The lens 100 starts operating when the lens 100 receives power and an operation initialization signal from the body unit 200 (Operation S101). When the lens 100 starts operating, the lens 100 transmits information regarding the lens 100 to the body unit 200 (Operation S102). The information regarding the lens 100 may be information in regards to AF, such as information related to a focal length, a focus (F) value of the lens 100, focus configuration of the lens 100, the lens driving actuator 105, possibility of the AF operation, the location of the focus lens 104, a point of time, defocus amount, and a conversion factor regarding movement amount of the focus lens 104. After the lens 100 transmits the information regarding the lens 100, the lens 100 checks whether a timer reset signal for resetting the first timer 111 is applied from the body unit 200 (Operation S103). When the timer reset signal is applied, the first timer 111 included in the lens controller 110 is reset in real time. A communication-pin control signal, for example, a signal for changing communication-pin state is received from the body unit 200, and a communication pin used in real time communication from among communication pins of the lens mount 109 is changed to non-real time communication (serial communication) (Operation S104).

After the timer reset signal is received, an instruction for driving the lens 100 is received from the body unit 200 (Operation S105), and driving of the focus lens 104 is started according to the instruction (Operation S106). That is, the AF operation is started.

While the lens 100 is being driven, it is checked whether information is requested from the body unit 200 (Operation S107). When information is requested, lens information or lens location information according to a situation of the lens 100 is transmitted to the body unit 200 (Operation S108). The lens information varies during the driving of the lens 100, such as information regarding the focal length of the lens 100. If the focal length is changed by a zooming operation to change a view angle, since measurements of the AF estimation value that have been obtained so far is no longer continuous, the AF estimation values may not be used for AF detection. Thus, when the focal length is changed, the AF operation may be restarted from this point of time. The lens information is transmitted to the body unit 200 in order to restart the AF operation, when a parameter related to the AF detection changes. This control is performed by the body unit 200. The lens location information is detected by the focus lens location detecting sensor 106. The lens location information may be, for example, information stored at the timing of L1 to L15 of FIG. 5.

A lens driving location is stored at a frequency corresponding to a predetermined period of time, for example, 4 ms, according to movement of the focus lens 104 (Operation S109). The predetermined period of time for storing the lens driving location does not have to be synchronized with the timing signal generated by the imaging-device controller 205. According to the present embodiment, the predetermined period of time may be 4 ms, and may be smaller than 16.67 ms, that is, smaller than the periodicity at which the imaging device 204 generates subject images. However, when the predetermined period of time is extremely short, a period of time taken for communication between the body unit 200 and the lens 100 may increase, and thus the period of time may be about 2 ms to about 4 ms. Alternatively, the predetermined period of time may be determined by receiving fps information regarding a period in which the imaging device 204 generates and outputs the subject image from the body unit 200. However, the predetermined period of time may be set to be smaller than the period at which the image signal is output in the imaging device 204.

The lens 100 determines whether information is changed in the predetermined period of time (Operation S110). That is, it is determined whether the lens information is changed, or whether the location of the lens 100 is changed. In the presence of any change, the lens information and the lens location information are transmitted to the body unit 200 (Operation S111). The transmitting of the lens location information does not have to be synchronized with the timing signal generated by the imaging-device controller 205.

It is determined whether target location information is received from the body unit 200 (Operation S112). When the target location information is received, the lens 100 is driven to a target location. The target location is a focal point location. When the target location information is not received, which is the case when a peak value of the AF estimation value has not been calculated, the method returns to operation S103 so that the lens 100 is repeatedly driven.

An operation of the body unit 200 will now be described.

When the manipulation button 207 in the body unit 200 is manipulated, that is, when the half-press signal is applied, the body unit 200 begins operating, and then the body unit 200 supplies power to the lens 100 to start driving of the lens 100 (Operation S201). When the lens 100 is driven, the lens information transmitted from the lens controller 110 is received (Operation S202). The second timer 228 included in the body unit 200 is reset (Operation S203). Simultaneously, a first timer reset signal is transmitted to the lens 100 by using a communication pin used in real time communication from among terminals included in the camera mount 208 (Operation S204). Fps information regarding a period in which a subject image is accumulated or is output, and a communication-pin control signal for changing a state of the communication pin used in real time communication to non-real time communication (serial communication) are transmitted.

It is determined whether information transmitted from the lens 100 is received (Operation S205). When it is determined that the information is received, lens information and lens location information transmitted from the lens 100 are received (Operation S206). The body unit 200 may receive information from the lens 100 by using a method in which the lens 100 transmits the information without first receiving a request for the information or a method in which the lens 100 transmits the information to the body unit 200 in response to a request for the information. Operation S205 is performed when the lens 100 transmits the information without first receiving a request for the information. The method according to the present embodiment includes determining whether the information is received, but the invention is not limited thereto. For example, the CPU 224 may use an interrupt function. In this case, an algorithm used in the method may be configured in such a way that operation S205 is performed when an interrupt event occurs by receiving information from the lens 100.

The body unit 200 instructs the lens 100 to drive the lens 100 to start driving of the lens 100 (Operation S207). The imaging device 204 captures a subject image (Operation S208), and an AF estimation value is calculated using an image signal generated by the capturing of the subject image (Operation S209). Since an operational algorithm of the lens 100 and the body unit 200 is repeatedly looped, the AF estimation value is repeatedly calculated, as described with reference to FIG. 6. During the repetition, the focus lens 104 is driven at a predetermined speed, and the AF estimation value and information regarding a point of time for calculating the AF estimation value are stored in a memory of the CPU 224 (Operation S210).

The body unit 200 requests the lens 100 for stored information during lens driving (Operation S211), and it is determined whether the lens information and the lens location information are received according to the request (Operation S212). When the lens information is received, it is determined whether a focal length is changed (Operation S213). When the focal length is changed, it is determined that the lens 100 has been zoomed, and stored values including the AF estimation values, the lens location information and time information corresponding to the lens location information that have been obtained so far are reset (Operation S214). When the lens 100 has been zoomed, since the information previously stored cannot be used, the AF operation is restarted. When it is determined that the focal length has not changed in operation S213, the received lens location information and time information corresponding to the lens location information are stored (Operation S215). When the lens information and the lens location information are not received in operation S212, operations S213 to S215 are skipped.

It is determined whether a peak location has been passed by the calculated AF estimation value, or whether the number of received lens location information is three or more (Operation S216). When the number of received lens location information is three or more, an actual peak location is calculated from the AF estimation value and the lens location by using an interpolation calculation (Operation S217).

When it is determined that the peak location has not been passed by the calculated AF estimation value, or that the number of received lens location information is less than three, the method returns to operation S205 to continue to drive the lens 100 and to calculate the AF estimation value.

When the peak location is calculated in operation S217, the target location of the focus lens 104 is transmitted to the lens controller 110 to instruct the lens controller 110 to drive the focus lens 104 to the target location (Operation S218). When the focus lens 104 is moved to the target location, the subject image is in complete focus.

The AF operation is completed by the above-described method.

Second Embodiment

With reference to FIGS. 9 through 12, a method of calculating a location of the focus lens 104, according to another embodiment of the invention, will be described.

Figure 9:
FIG. 9 is a pictorial diagram showing scan lines in another region, according to an embodiment of the invention.

FIG. 9 shows scan lines in a region e15, according to an embodiment of the invention.

With regard to the region e15, that is, an AF region located in a lower right portion of the multiple AF regions of the photograph screen of FIG. 3, the region e15 includes a plurality of scan lines AFareaL15[1] to AFareaL15[$a$]. According to the present embodiment, a case where AF detection is performed on the region e15 is exemplified.

Operation of Lens

Figure 10:
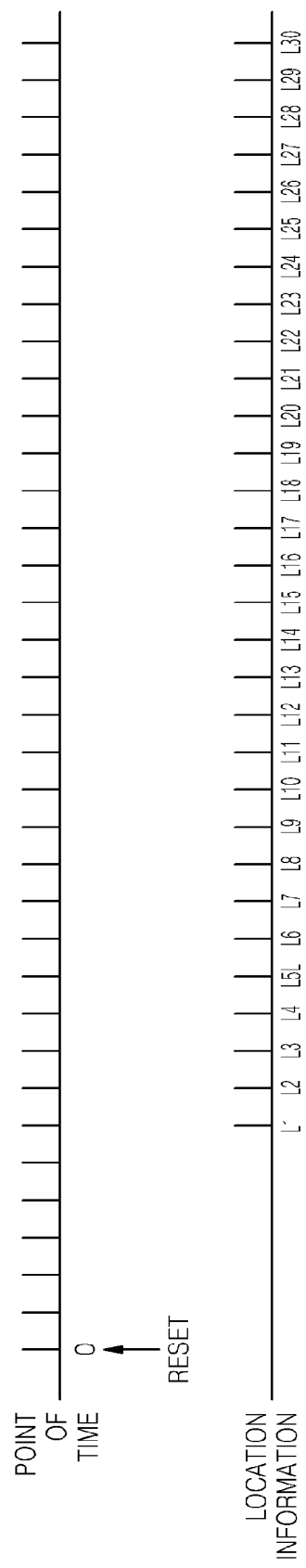
FIG. 10 is a timing diagram of an AF operation for a lens, according to another embodiment of the invention.

FIG. 10 is a timing diagram of the AF operation for the lens 100, according to another embodiment of the invention.

The lens controller 110 receives time-measurement period information from the camera controller 209, and sets a time-measurement period of the first timer 111 according to the time-measurement period information. The lens controller 110 resets the first timer 111 according to instruction from the camera controller 209 so that the first timer 111 may have the same reference point of time as that of the body unit 200. The lens controller 110 stores location information detected by the focus lens location detecting sensor 106 at a frequency corresponding to a predetermined period of time. The time-measurement period information received from the body unit 200 may correspond to the predetermined period of time. For example, the predetermined period of time may be 2 ms, but is not limited to and may be a period of time smaller than 16.67 ms (for cases where the image device is driven at a frame rate of 60 fps), that is, smaller than the periodicity at which the imaging device 204 generates image signals. Location information corresponding to the lens 100 is stored according to the time-measurement period. The location information corresponding to timing of L1, L2, . . . and L30 is stored in memory.

Operation of Body Unit

Figure 11:
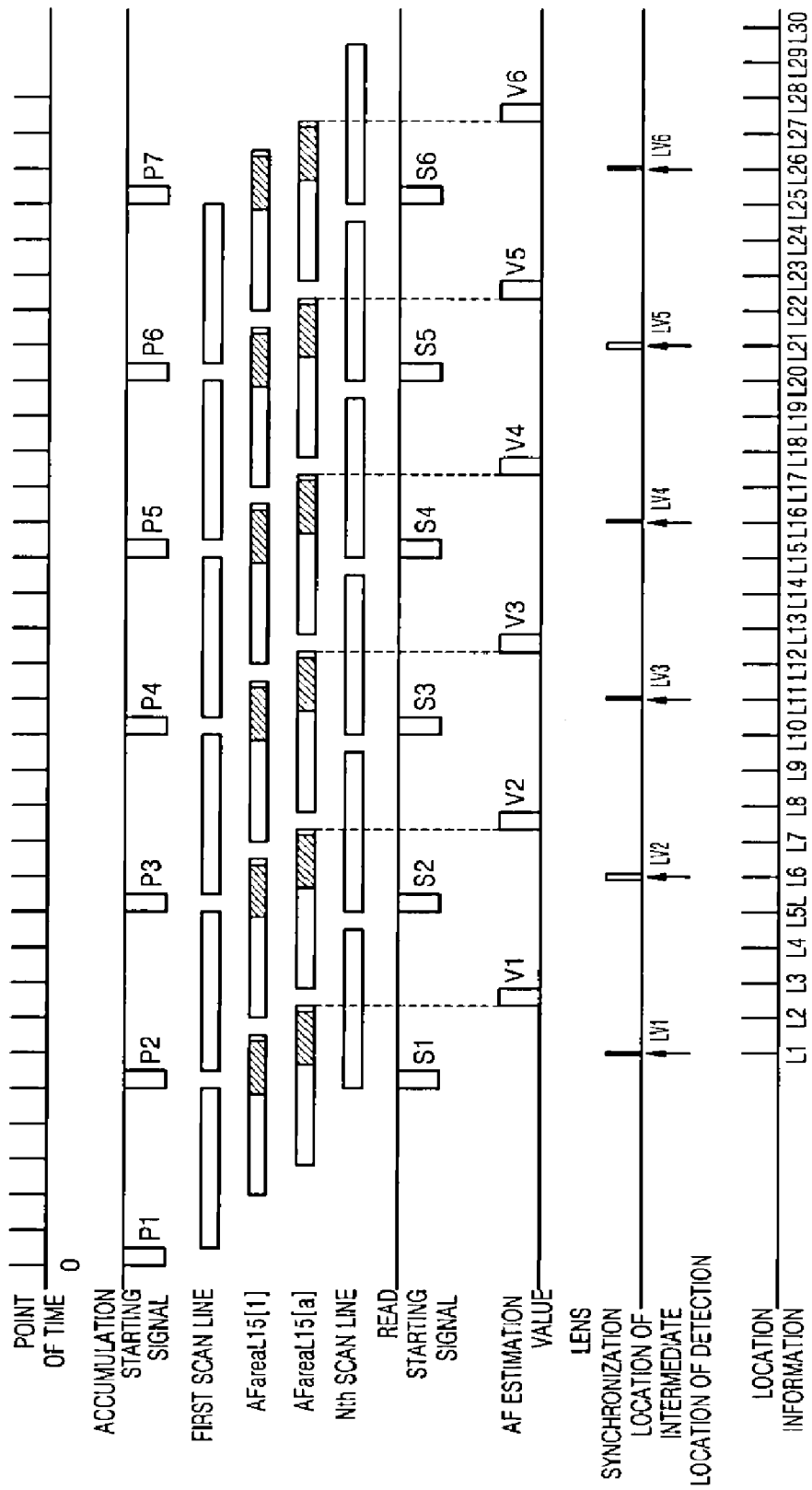
FIG. 11 is a timing diagram of an AF operation for a body unit corresponding to the lens of FIG. 10, according to another embodiment of the invention.

FIG. 11 is a timing diagram of the AF operation for the body unit 200 corresponding to the lens of FIG. 10, according to another embodiment of the invention.

The second timer 228 included in the camera controller 209 operates in the same period of time as that the time-measurement period corresponding to the time-measurement information transmitted to the lens controller 110. In addition, when the second timer 228 is reset, a signal requesting reset is transmitted to the lens 100. The signal is transmitted from the body unit 200 to the lens 100 by using signal terminals of the lens mount 109 and the camera mount 208, that is, pins operating in real time communications from among other communication pins.

Referring to FIG. 11, a plurality of timing diagrams of accumulation starting signals, charge accumulation signals of the first scan line, charge accumulation signals of the scan lines AFareaL15[1] to AFareaL15[$a$] on which AF detection is performed, charge accumulation signals of the $n^{th}$ scan line and read starting signals of the image signals are sequentially illustrated from top to bottom. In addition to the timing diagrams, timing for calculating the AF estimation value, lens synchronization locations corresponding to intermediate points of time of AF detection and the location information of the lens 100 corresponding to the lens synchronization locations are illustrated. The read starting signals are generated whenever the charge accumulation signal of the first scan line is finished. An AF estimation value V1 is calculated after a predetermined time delay required for calculation from when the charge accumulation signals of AFareaL15[1] to AFareaL15[$a$] are finished. While the operations are being repeated and while the focus lens 104 moves continually at a predetermined speed, the AF estimation values V2 to V6 are calculated.

It is assumed that timing for obtaining the image signal used for AF detection in the region e15, which is an AF region, is an intermediate point of time of charge accumulation times of AFareaL15[1] to AFareaL15[$a$]. That is, an intermediate point of time between a starting time of the charge accumulation signal of AFareaL15[1], and a finishing time of the charge accumulation signal of AFareaL15[$a$] is assumed to be the timing for obtaining the image signal. In addition, the location of the focus lens 104 may be detected at the timing.

The camera controller 209 receives lens location information based on a point of time of the first timer 111 included in the lens 100. In this case, since the first timer 111 and the second timer 228 have the same point of time, location information stored at lens synchronization locations LV1, LV2, etc. is obtained. As illustrated in FIG. 7, a lens synchronization location having a peak value is calculated using a lens synchronization location and AF estimation value, and a location of the focus lens 104 corresponding to the lens synchronization location having the peak value is determined from the location information. Depending on the cases, the lens synchronization location may not be matched with the timing of the stored location information memory. In this case, a surrounding location may be used, or a lens location may be calculated using an interpolation calculation.

The AF operation may be performed by obtaining the peak value of contrast of the subject image from the lens synchronization location and the AF estimation value that are obtained as described above. Hereinafter, the AF operation in the lens 100 and the body unit 200 will be described in detail.

Method of Driving Camera System

Figure 12A:
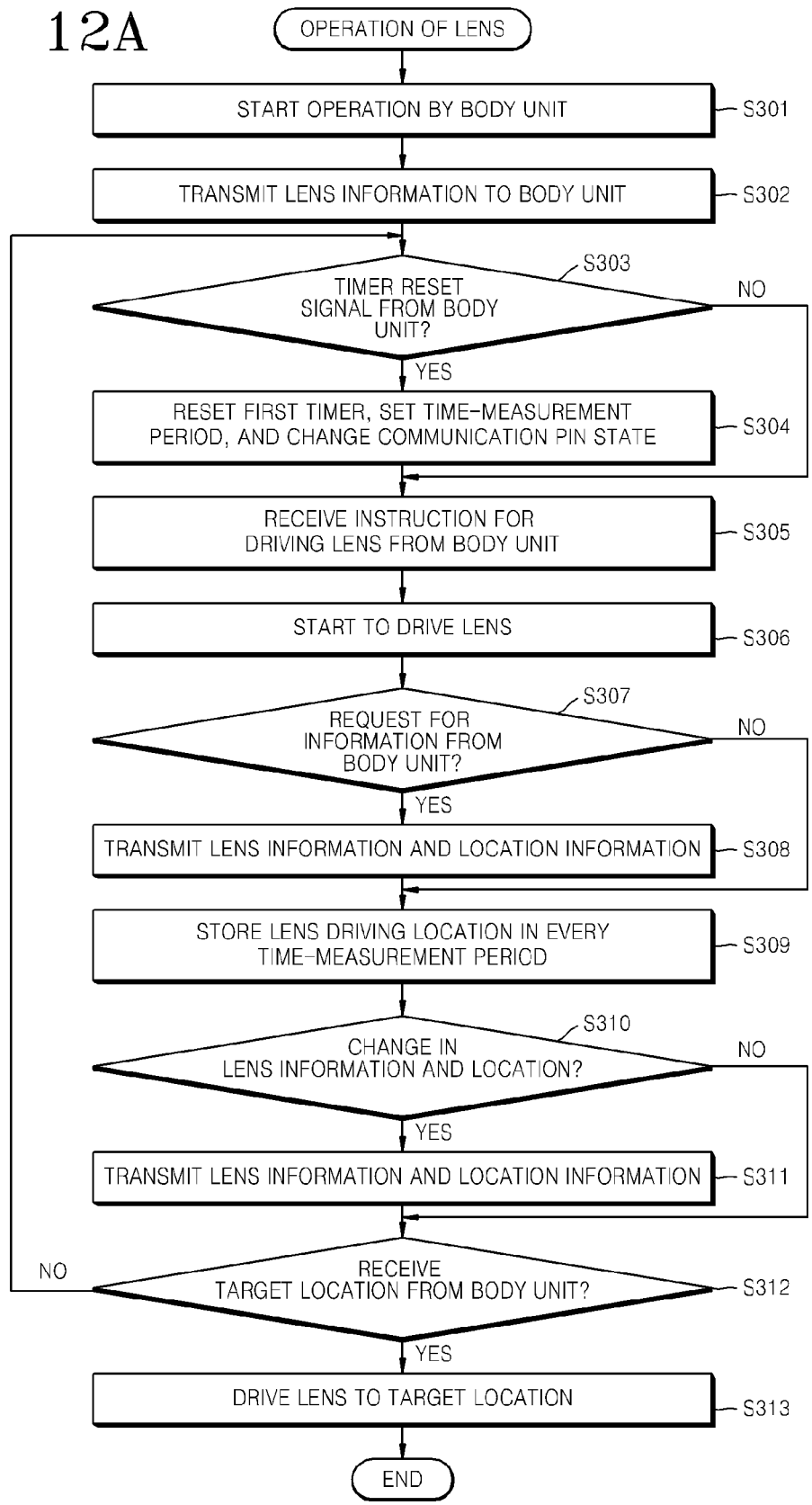
FIG. 12A through FIG. 12C are flowcharts illustrating a method of driving a camera system including the lens of FIG. 10 and the body unit of FIG. 11, according to another embodiment of the invention.
Figure 12B:
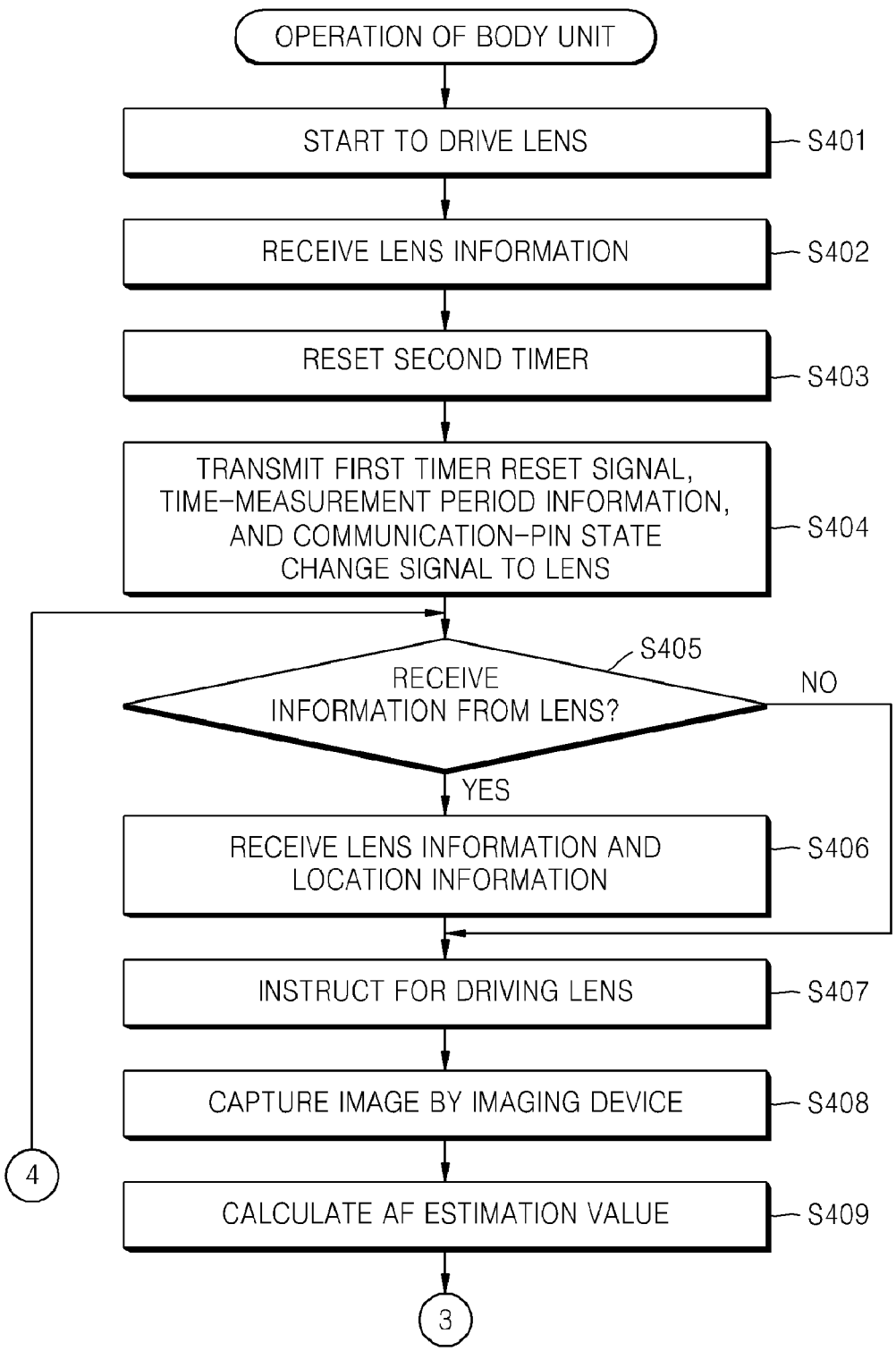
Figure 12C:
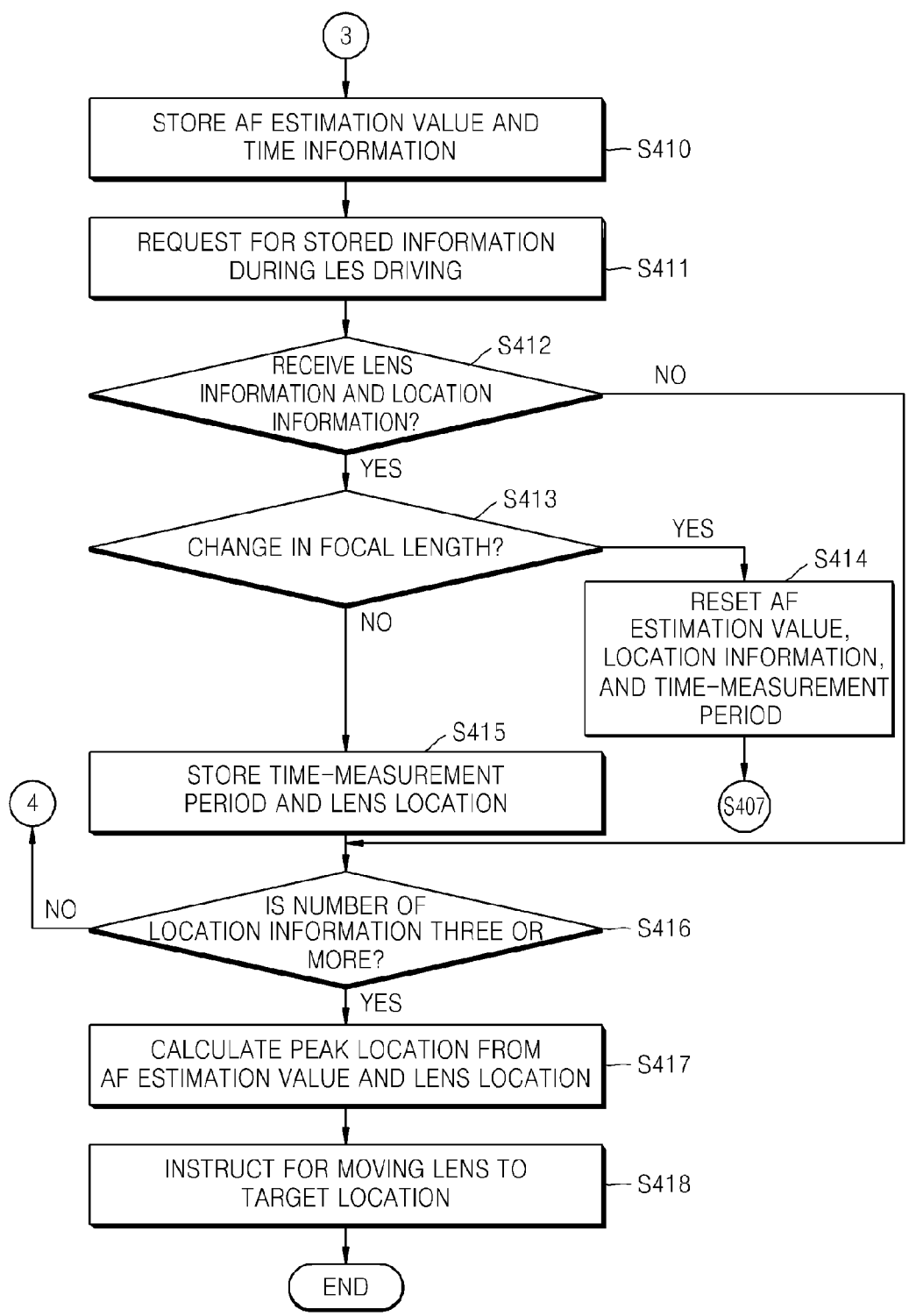

FIGS. 12A through 12C are flowcharts illustrating a method of driving the camera system 1 of FIGS. 10 and 11, according to another embodiment of the invention. The operations of the lens 100 and the body unit 200 of FIG. 12A through 12C are similar to the case of FIG. 8A through 8C, and thus the operations of the lens 100 and the body unit 200 will be described in terms of differences from FIGS. 8A through 8C.

First, an operation of the lens 100 will be described.

The lens 100 starts operating when the lens 100 receives power and an operation initialization signal from the body unit 200 (Operation S301). When the lens 100 starts operating, the lens 100 transmits information regarding the lens 100 to the body unit 200 (Operation S302). After the lens 100 transmits information regarding the lens 100, the lens 100 checks whether a timer reset signal for resetting the first timer 111 is applied from the body unit 200 (Operation S303). When the timer reset signal is applied, the first timer 111 included in the lens controller 110 is reset in real time. In addition, a time-measurement period of the first timer 111 is set according to time-measurement period information transmitted from the body unit 200. A communication-pin control signal, for example, a signal for changing communication-pin state is received from the body unit 200, and a communication pin used in real time communication from among communication pins of the lens mount 109 is changed to non-real time communication (serial communication) (Operation S304).

After the timer reset signal is received, an instruction for driving the lens 100 is received from the body unit 200 (Operation S305), and driving of the focus lens 104 is started according to the instruction (Operation S306). That is, the AF operation is started.

While the lens 100 is being driven, it is checked whether information is requested from the body unit 200 (Operation S307). When information is requested, lens information or lens location information according to a situation of the lens 100 is transmitted to the body unit 200 (Operation S308).

A lens driving location is stored at a frequency corresponding to a predetermined time-measurement period according to movement of the focus lens 104 (Operation S309). The time-measurement period may be smaller than 16.67 ms, that is, the period in which the imaging device 204 accumulates a subject image. For example, the time-measurement period may be 2 ms.

The lens 100 determines whether information is changed in the predetermined time-measurement period (Operation S310). That is, it is determined whether the lens information is changed, or whether the location of the lens 100 is changed. In the presence of any change, the lens information and the lens location information are transmitted to the body unit 200 (Operation S311).

It is determined whether target location information is received from the body unit 200 (Operation S312). When the target location information is received, the lens 100 is driven to a target location. The target location is a focal point location. When the target location information is not received, which is the case when a peak value of the AF estimation value has not been calculated, the method returns to operation S303 so that the lens 100 is repeatedly driven.

An operation of the body unit 200 will now be described.

When the manipulation button 207 in the body unit 200 is manipulated, the body unit 200 begins operating, and then the body unit 200 supplies power to the lens 100 to start driving the lens 100 (Operation S401). When the lens 100 is driven, the lens information transmitted from the lens controller 110 is received (Operation S402). The second timer 228 included in the body unit 200 is reset (Operation S403). Simultaneously, a first timer reset signal is transmitted to the lens 100 by using a communication pin used in real time communication from among terminals included in the camera mount 208 (Operation S404). The time-measurement period to be used in the first timer 111, and a communication-pin control signal for changing a state of a communication pin used in real time communication to non-real time (serial communication) are transmitted.

It is determined whether information transmitted from the lens 100 is received (Operation S405). When it is determined that the information is received, lens information and lens location information transmitted from the lens 100 are received (Operation S406). The body unit 200 may receive information from the lens 100 by using a method in which the lens 100 transmits the information without first receiving a request for the information or a method in which the lens 100 transmits the information to the body unit 200 in response to a request for the information. Operation S405 is performed when the lens 100 transmits the information without first receiving a request for the information. The method according to the present embodiment includes determining whether the information is received, but the invention is not limited thereto. For example, the CPU 224 may use an interrupt function. In this case, an algorithm used in the method may be configured in such a way that operation S405 is performed when an interrupt event occurs by receiving information from the lens 100.

The body unit 200 instructs the lens 100 to drive the lens 100 to start driving the lens 100 (Operation S407). The imaging device 204 captures a subject image (Operation S408), and an AF estimation value is calculated using an image signal generated by the capturing of the subject image (Operation S409). Since an operational algorithm of the lens 100 and the body unit 200 is repeatedly looped, the AF estimation value is repeatedly calculated, as described with reference to FIG. 11. During the repetition, the focus lens 104 is driven at a predetermined speed, and the AF estimation value and information regarding a point of time for calculating the AF estimation value are stored in a memory of the CPU 224 (Operation S410).

The body unit 200 requests the lens 100 for stored information during lens driving (Operation S411), and it is determined whether the lens information and the lens location information are received according to the request (Operation S412). When the lens information is received, it is determined whether a focal length is changed (Operation S413). When the focal length is changed, it is determined that the lens 100 has been zoomed, and stored values including the AF estimation values, the lens location information and time-measurement period information that have been obtained so far are reset (Operation S414). When it is determined that the focal length has not been changed in operation S413, the received lens location information and time-measurement period information are stored (Operation 415). When the lens information and the lens location information are not received in operation S412, operations S413 to S415 are skipped.

It is determined whether a peak location has been passed by the calculated AF estimation value, or whether the number of received lens location information is three or more (Operation S416). When the number of received lens location information is three or more, an actual peak location is calculated from the AF estimation value and the lens location by using an interpolation calculation (Operation S417).

When it is determined that the peak location has not been passed by the calculated AF estimation value, or that the number of received the lens location information is less than three, the method returns to operation S405 to continue to drive the lens 100 and to calculate the AF estimation value.

When the peak location is calculated in operation S417, the target location of the focus lens 104 is transmitted to the lens controller 110 to instruct the lens controller 110 to drive the focus lens 104 to the target location (Operation 418). When the focus lens 104 is moved to the target location, the subject image is in complete focus.

The AF operation is completed by the above-described method.

Third Embodiment

Figure 14:
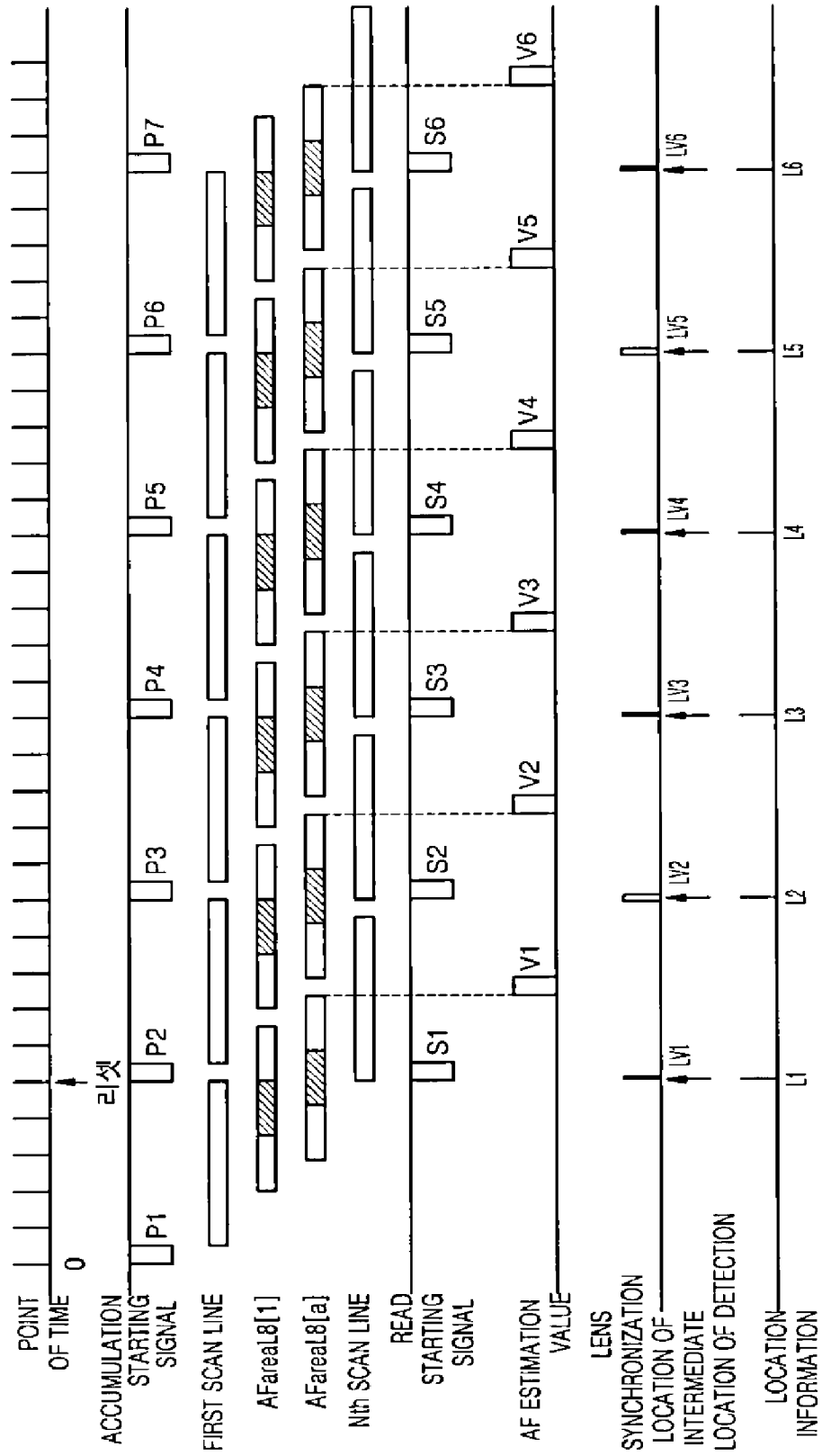
FIG. 14 is a timing diagram of an AF operation for a body unit corresponding to the lens of FIG. 13, according to another embodiment of the invention.

With reference to FIGS. 13 through 15, a method of calculating the location of the focus lens 104, according to another embodiment of the invention, will be described. According to the present embodiment, a time period between points of time of intermediate points of time of AF detection in an AF region is used as a time-measurement period used to share information in the lens 100 and the body unit 200. AF detection is performed with respect to a region e8, that is, the AF region located in the center of the multiple AF regions of photograph screen, like in the case of FIG. 3.

The second timer 228 included in the camera controller 209 operates as a predetermined basic clock, and has timing information regarding a time period between points of time of intermediate points of time of AF detection in the AF region. However, the camera controller 209 does not transmit the timing information to the lens 100 continuously, but transmits only fps information as frequency information to the lens 100 at the beginning of communication. The lens 100 sets the first timer 111 to have a time-measurement period corresponding to a frequency of the received fps information.

Operation of Lens

FIG. 13 is a timing diagram of the AF operation in the lens 100, according to an embodiment of the invention.

Referring to FIG. 13, the first timer 111 operates as a basic clock. The lens controller 110 sets the first timer 111 to have the time-measurement period according to the received fps information. The lens controller 110 resets a clock of the first timer 111 according to an instruction of the camera controller 209, and sets the time-measurement period at initial timing at which location information is stored. The lens controller 110 stores location information detected by the focus lens location detecting sensor 106 at a frequency corresponding to a predetermined period of time, that is, the set time-measurement period. The predetermined period of time may be 16.67 ms (for cases where the image device is driven at a framerate of 60 fps), that is, the period in which the imaging device 204 generates an image signal. The location information corresponding to timing of L1, L2, . . . and L6 is stored in memory.

Operation of Body Unit

FIG. 14 is a timing diagram of the AF operation for the body unit 200 corresponding to the lens 100 of FIG. 13, according to another embodiment of the invention.

The second timer 228 included in the camera controller 209 operates as a basic clock, and is reset at a predetermined point of time. The camera controller 209 sets the time-measurement period at the intermediate points of AF detection as that of the second timer 228. The time-measurement period may be 16.67 ms for case where the image device is driven at a framerate of 60 fps. When the second timer 228 is reset and the time-measurement period of the second timer 228 is set, the first timer 111 is reset and a time-measurement period of the first timer 111 is set, simultaneously. The first timer 111 is reset and the time-measurement period of the first timer 111 is set using signal terminals included in the lens mount 109 and the camera mount 208, that is, pins operating in real time communications from among other communication pins.

Referring to FIG. 14, a plurality of timing diagrams of the basic clock of the second timer 228, accumulation starting signals of the imaging device 204, charge accumulation signals of the first scan line, charge accumulation signals of the scan lines AFareaL8[1] to AFareaL8[$a$] on AF detection is performed, charge accumulation signals of the $n^{th}$ scan line and read starting signals of the image signals are sequentially illustrated from above. In addition to the timing diagrams, timing for calculating the AF estimation value, lens synchronization locations corresponding to intermediate points of time of AF detection, and the location information of the lens 100 corresponding to the lens synchronization locations are illustrated. The read starting signals are generated whenever the charge accumulation signal of the first scan line is finished. An AF estimation value V1 is calculated after a predetermined time delay required for calculation from when the charge accumulation signals of AFareaL8[1] to AFareaL8[$a$] are finished. While the operations are being repeated and while the focus lens 104 moves continually at a predetermined speed, AF estimation values V2 to V6 are calculated.

It is assumed that timing for obtaining the image signal used for AF detection in the region e8, which is an AF region, is an intermediate point of time of charge accumulation times of AFareaL8[1] to AFareaL8[$a$]. That is, an intermediate point of time between the a starting time of the charge accumulation signal of AFareaL8[1] and the finishing time of the charge accumulation signal of AFareaL8[$a$] is assumed to be the timing for obtaining the image signal. In addition, the location of the focus lens 104 may be detected at the timing.

The camera controller 209 receives lens location information based on a point of time of the first timer 111 included in the lens 100. In this case, since the first timer 111 and the second timer 228 have the same point of time, location information stored at lens synchronization locations LV1, LV2, etc. is obtained. According to the present embodiment, since the lens location information is stored at the same timing as in the location synchronization locations LV1, LV2, etc., a location of the focus lens 104 with respect to the lens synchronization location may be calculated by matching the lens location information with the location synchronization location.

The AF operation may be performed by obtaining the peak value of contrast of the subject image from the lens synchronization location and the AF estimation value that are obtained as described above. Hereinafter, the AF operation in the lens 100 and the body unit 200 will be described in detail.

Method of Driving Camera System

Figure 15A:
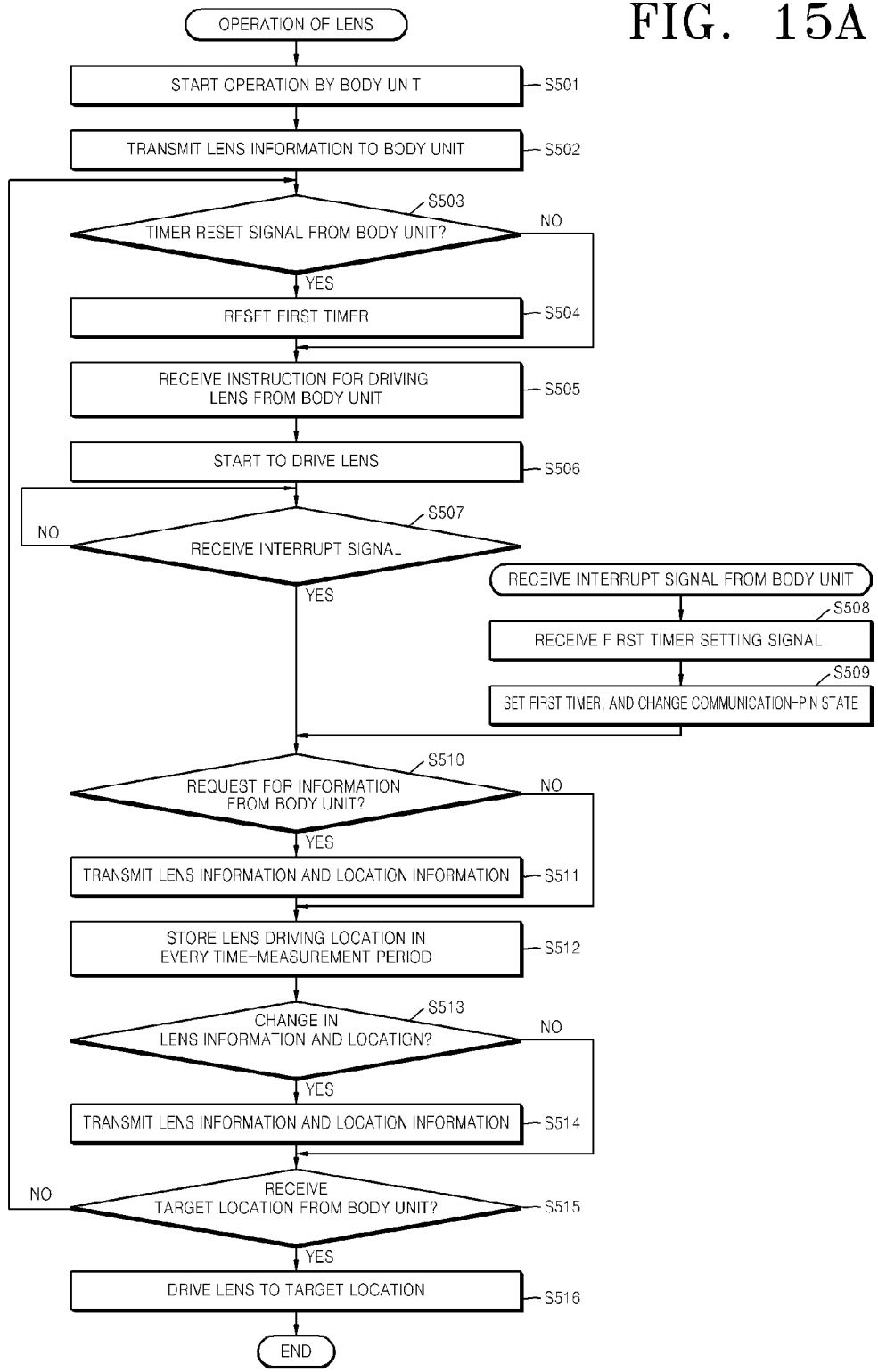
FIG. 15A through FIG. 15C are flowcharts illustrating a method of driving a camera system including the lens of FIG. 13 and the body unit of FIG. 14, according to another embodiment of the invention.
Figure 15B:
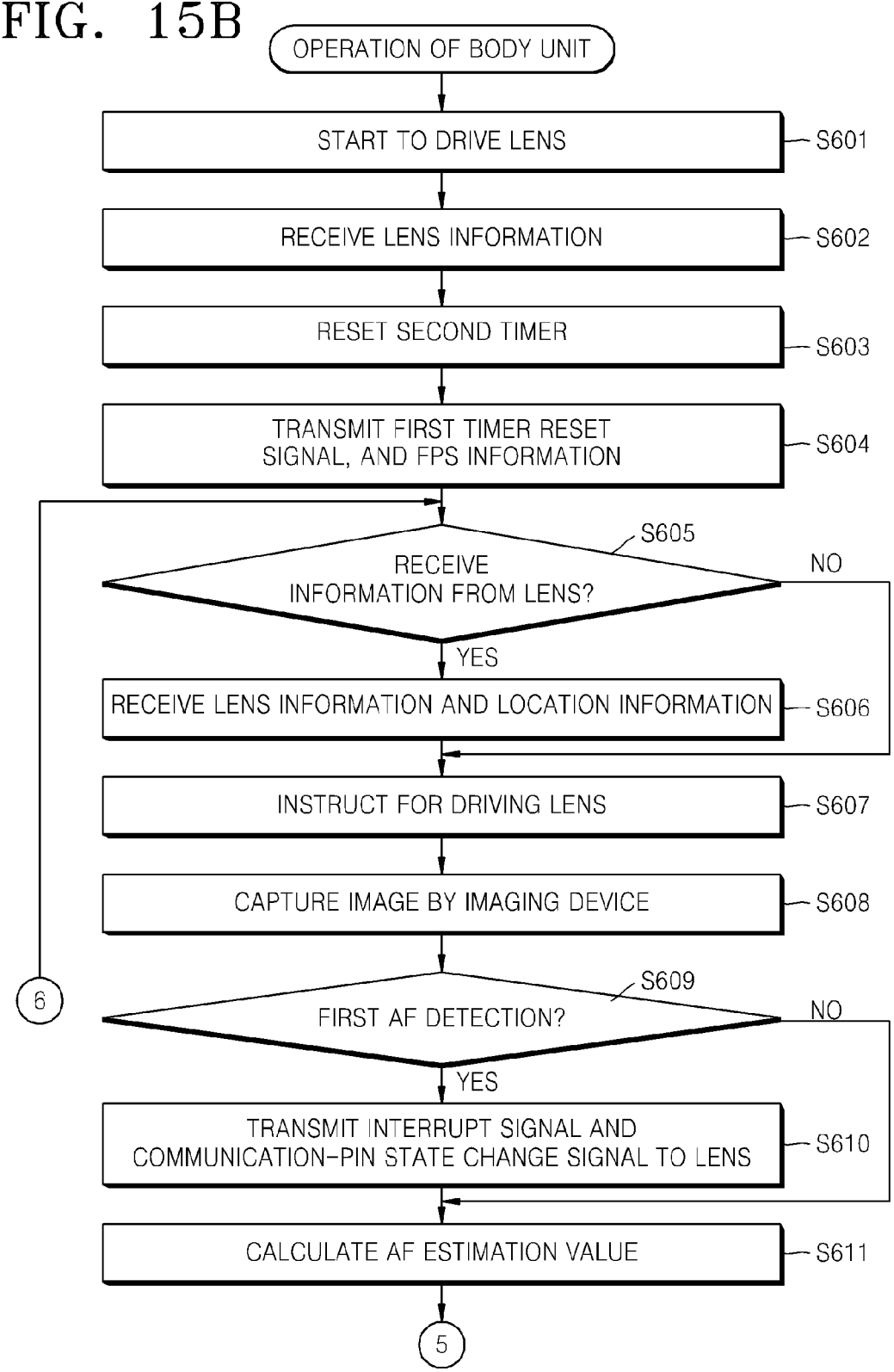
Figure 15C:
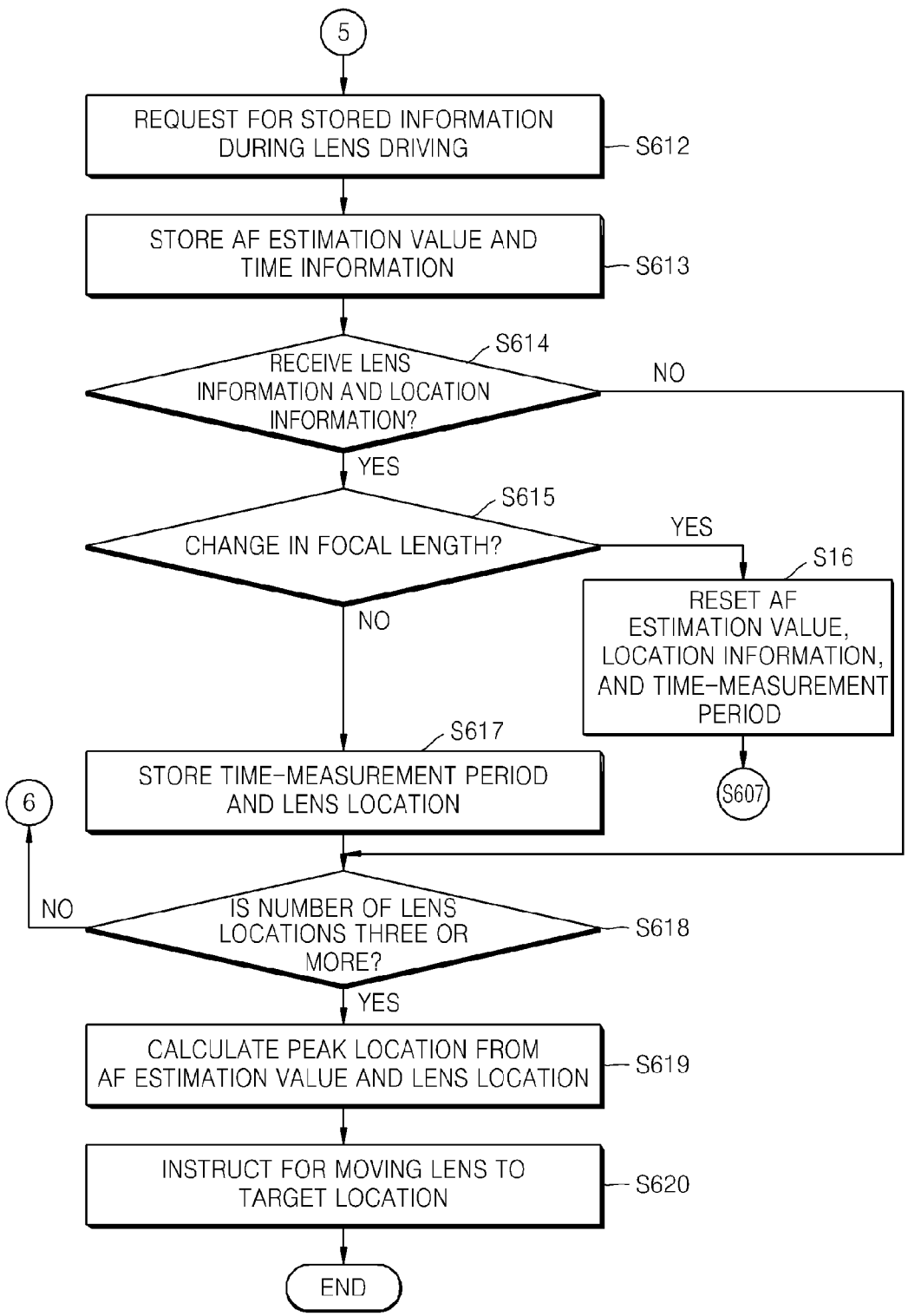

FIG. 15A through 15C are flowcharts of illustrating a method of driving the camera system 1 of FIGS. 13 and 14, according to another embodiment of the invention.

The operations of the lens 100 and the body unit 200 of FIG. 15A through 15C are similar to the cases of FIGS. 8A through 8C and 12A through 12C, and thus the operations of the lens 100 and the body unit 200 will be described in terms of differences from FIGS. 8A through 8C and 12A through 12C.

First, an operation of the lens 100 will be described.

The lens 100 starts operating when the lens 100 receives power and an operation initialization signal from the body unit 200 (Operation S501). When the lens 100 starts operating, the lens 100 transmits information regarding the lens 100 to the body unit 200 (Operation S502). After the lens 100 transmits information regarding the lens 100, the lens 100 checks whether a timer reset signal for resetting the first timer 111 is applied from the body unit 200 (Operation S503).

When the timer reset signal is applied, the first timer 111 included in the lens controller 110 is reset in real time. In addition, when the timer reset signal is applied, the first timer 111 included in the lens controller 110 is reset in real time (Operation S504).

After the timer reset signal is received, an instruction for driving the lens 100 is received from the body unit 200 (Operation S505), and driving of the focus lens 104 is started according to the instruction (Operation S506). That is, the AF operation is started.

The lens 100 is on standby to receive an interrupt signal from the body unit 200. The interrupt signal is for setting the first timer 111 included in the lens controller 110. Since real time communication is required, interrupt control is performed. A stand-by time taken to receive the interrupt signal may be about 10 to about several tens of milliseconds (ms) from when the lens 100 is driven to when initial AF detection is to be performed.

In operation S507, it is determined whether the interrupt signal is received. However, operation S507 of the method is performed from second iteration thereof. That is, when the interrupt signal is received, since the method is started from operation S508, operation S507 is not performed in first iteration of the method. From the second iteration of the method, when the interrupt signal is received, operation S510 proceeds.

When the interrupt signal is received from the camera controller 209, the interrupt signal is transmitted via a communication pin used in real time communication from among communication pins of the lens mount 109. When the interrupt signal is received, the method is performed from operation S508, and a first timer setting signal is received (Operation S508). The first timer setting signal is a time-measurement period shared by the lens 100 and the body unit 200.

The first timer 111 is set to have a predetermined time-measurement period according to the interrupt signal, and a state of the communication pin used in the real time communication is changed to be used in non-real time communication (serial communication) (Operation S509).

While the lens 100 is being driven, it is checked whether information is requested from the body unit 200 (Operation S510). When information is requested, lens information or lens location information according to a situation of the lens 100 is transmitted to the body unit 200 (Operation S511).

A lens driving location is stored at a frequency corresponding to a predetermined time-measurement period, that is, 16.67 ms, according to movement of the focus lens 104 (Operation S512).

The lens 100 determines whether information is changed in the predetermined time-measurement period of time (Operation S513). That is, it is determined whether the lens information is changed, or whether the location of the lens 100 is changed. In the presence of any change, the lens information and the lens location information are transmitted to the body unit 200 (Operation S514).

It is determined whether target location information is received from the body unit 200 (Operation S515). When the target location information is received, the lens 100 is driven to a target location. The target location is a focal point location. When the target location information is not received, which is the case when a peak value of the AF estimation value has not been calculated, the method returns to operation S503 so that the lens 100 is repeatedly driven.

An operation of the body unit 200 will now be described.

When the manipulation button 207 in the body unit 200 is manipulated, the body unit 200 begins operating, and then the body unit 200 supplies power to the lens 100 to start driving of the lens 100 (Operation S601). When the lens 100 is driven, the lens information transmitted from the lens controller 110 is received (Operation S602). The second timer 228 included in the body unit 200 is reset (Operation S603). Simultaneously, a first timer reset signal is transmitted to the lens 100 by using a communication pin used in real time communication from among terminals included in the camera mount 208 (Operation S604). Fps information for time-measurement period information to be used in the first timer 111 is transmitted.

It is determined whether information transmitted from the lens 100 is received (Operation S605). When it is determined that the information is received, lens information and lens location information transmitted from the lens 100 are received (Operation S606). The body unit 200 may receive information from the lens 100 by using a method in which the lens 100 transmits the information without first receiving a request for the information or a method in which the lens 100 transmits the information to the body unit 200 in response to a request for the information. Operation S605 is performed when the lens 100 transmits the information without first receiving a request for the information. The method according to the present embodiment includes determining whether the information is received, but the invention is not limited thereto. For example, the CPU 224 may use an interrupt function. In this case, an algorithm used in the method may be configured in such a way that operation S405 is performed when an interrupt event occurs by receiving information from the lens 100.

The body unit 200 instructs the lens 100 to drive the lens 100 to start driving of the lens 100 (Operation S607). The imaging device 204 captures a subject image (Operation S608). It is determined whether an AF estimation value is first calculated using an image signal generated by the capturing of the subject image (Operation S609). When the AF estimation value is first calculated, an interrupt signal and a communication-pin state change signal are transmitted to the lens 100 (Operation S610).

When the subject image is captured, the AF estimation value is calculated using the generated image signal (Operation S611). In this case, since an operational algorithm of the lens 100 and the body unit 200 is repeatedly looped, the AF estimation value is repeatedly calculated, as described with reference to FIG. 11. During the repetition, the focus lens 104 is driven at a predetermined speed, and the AF estimation value and information regarding a point of time for calculating the AF estimation value are stored in a memory of the CPU 224 (Operation S612).

The body unit 200 requests the lens 100 for stored information during lens driving (Operation S613), and it is determined whether the lens information and the lens location information are received according to the request (Operation S614). When the lens information is received, it is determined whether a focal length is changed (Operation S615). When the focal length is changed, it is determined that the lens 100 has been zoomed, and stored values including the AF estimation values, the lens location information and time-measurement period information that have been obtained so far are reset (Operation S616). When it is determined that the focal length has not been changed in operation S615, the received lens location information and time-measurement period information are stored (Operation S617). When the lens information and the lens location information are not received in operation S614, operations S615 to S617 are skipped.

It is determined whether a peak location has been passed by the calculated AF estimation value, or whether the number of received lens location information is three or more (Operation S618). When the number of received lens location information is three or more, an actual peak location is calculated from the AF estimation value and the lens location by using an interpolation calculation (Operation S619).

When it is determined that the peak location has not been passed by the calculated AF estimation value, or that the number of received lens location information is less than three, the method returns to operation S605 to continue to drive the lens 100 and to calculate the AF estimation value.

When the peak location is calculated in operation S619, the target location of the focus lens 104 is transmitted to the lens controller 110 to instruct the lens controller 110 to drive the focus lens 104 to the target location (Operation S620). When the focus lens 104 is moved to the target location, the subject image is in complete focus.

The AF operation is completed by the above-described method.

As described above, in the camera system 1, although the lens 100 and the body unit 200 are controlled by respective controllers, the AF operation may be precisely performed by adjusting basic timing.

In addition, without a special communication pin for real time communication, controllers included in the lens 100 and the body unit 200 may be synchronized with each other, and thus the size and manufacturing cost of a camera may be reduced.

A program for executing the above-described methods according to embodiment of the invention in a camera system may be stored in a non-transitory recording medium. The recording medium may be the memory 211 of FIG. 2, or may be another separate recording medium. The recording medium may include a storage medium such as a magnetic storage medium (e.g., hard disk drive (HDD)) and an optical reading medium (e.g., CD-ROM and digital versatile disc (DVD)).

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components that perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A camera system comprising a replaceable lens and a body unit in which the replaceable lens is installed, wherein the replaceable lens comprises:
    a focus lens for changing a focal point location;
    a driver for driving the focus lens;
    a detector for detecting a location of the focus lens; and
    a lens controller comprising a timer for measuring a point of time, wherein the lens controller transmits information corresponding to the detected location of the focus lens to the body unit,
the body unit comprises:
    an imaging device for capturing light transmitted through the replaceable lens and for generating an image signal;

an imaging-device controller for generating a timing signal and for controlling the imaging device to capture the light in synchronization with the timing signal; and a camera controller for:
performing auto focusing (AF) detection on the image signal to calculate an AF estimation value,
storing the AF estimation value for each of respective AF detection time according to the timing signal,
calculating the focal point location by using location information transmitted from the replaceable lens and the stored AF estimation value, and
transmitting the result of the calculation to the replaceable lens, and wherein
the lens controller transmits the information corresponding to the location of the focus lens to the body unit asynchronously with the timing signal.

2. The camera system of claim 1, wherein the lens controller transmits the information corresponding to the location of the focus lens when:
the location of the focus lens changes, or
when a request for the information corresponding to the location of the focus lens is performed by the camera controller.

3. The camera system of claim 1, wherein:
the body unit and the replaceable lens communicate with each other, and
the camera controller transmits an instruction for resetting the timer to the lens controller.

4. The camera system of claim 1, further comprising:
a communication pin disposed between the body unit and the replaceable lens, wherein the communication pin is settable to operate in real time communication.

5. The camera system of claim 1, wherein timing at which the information corresponding to the location of the focus lens is stored in the replaceable lens is asynchronous with the timing signal.

6. The camera system of claim 1, wherein a frequency at which the replaceable lens transmits the information corresponding to the location of the focus lens is greater than a frequency of the timing signal.

7. A camera system comprising a replaceable lens and a body unit in which the replaceable lens is installed, wherein
the replaceable lens comprises:
a focus lens for changing a focal point location;
a driver for driving the focus lens;
a detector for detecting a location of the focus lens; and
a controller comprising a timer for adjusting a time-measurement period, wherein the controller transmits information corresponding to the detected location of the focus lens to the body unit, and the body unit comprises:
an imaging device for capturing light transmitted through the replaceable lens and for generating an image signal;
an imaging-device controller for generating a timing signal and for controlling the imaging device to capture the light in synchronization with the timing signal; and
a camera controller for:
performing auto focusing (AF) detection on the image signal to calculate an AF estimation value,
storing the AF estimation value for each of respective AF detection time according to the timing signal,
calculating the focal point location by using location information transmitted from the replaceable lens and the stored AF estimation value, and
transmitting the result of the calculation to the replaceable lens,.

wherein:
the body unit and the replaceable lens are configured to communicate with each other; and
the camera controller is configured to transmit an instruction for resetting the timer and information regarding the time-measurement period to the lens controller.

8. The camera system of claim 7, wherein the lens controller transmits the information corresponding to the location of the focus lens when:
the location of the focus lens changes, or
a request for the information corresponding to the location of the focus lens is performed by the camera controller.

9. The camera system of claim 7, wherein the time-measurement period of the timer is smaller than a period of the AF detection.

10. The camera system of claim 7, wherein the time-measurement period of the timer is the same as a period of the timing signal.

11. The camera system of claim 7, further comprising:
a communication pin disposed between the body unit and the replaceable lens, wherein the communication pin is settable to operate in real time communication.

12. The camera system of claim 7, wherein timing at which the information of the location of the focus lens is stored in the replaceable lens is asynchronous with the timing signal.

13. The camera system of claim 7, wherein a frequency at which the replaceable lens transmits the information corresponding to the location of the focus lens is greater than a frequency of the timing signal.

14. A camera system comprising a replaceable lens and a body unit in which the replaceable lens is installed, wherein
the replaceable lens comprises:
a focus lens; and
a driver for driving the focus lens,
the body unit comprises:
an imaging device for capturing light transmitted through the replaceable lens and for generating an image signal;
an imaging-device controller for controlling the imaging device to capture the light; and
a camera controller for calculating an AF estimation value from the image signal, and for performing an AF operation by which an operation of the replaceable lens and an operation of the body unit are synchronized with each other,
wherein the camera system further comprises:
a communication pin for communicating between the replaceable lens and the body unit, and
wherein
the communication pin is changeable between real time communication for synchronizing the operation of the replaceable lens and the operation of the body unit with each other and non-real time communication.

15. The camera system of claim 14, wherein:
the replaceable lens comprises a timer for synchronization with the body unit, and
when the communication pin is in a real time communication state, the replaceable lens resets the timer.

16. The camera system of claim 14, wherein the camera controller transmits to the replaceable lens an instruction for converting the communication pin from a real time communication state to a non-real time communication state.

17. A camera system comprising a replaceable lens and a body unit in which the replaceable lens is installed, wherein
the replaceable lens comprises:
a focus lens;
a driver for driving the focus lens; and
a timer for measuring a point of time,
wherein the body unit comprises:
an imaging device for capturing light transmitted through the replaceable lens and for generating an image signal;
an imaging-device controller for controlling the imaging device to capture the light; and
a camera controller for calculating an AF estimation value from the image signal, and for performing an AF operation,
wherein
the camera system further comprises a communication pin that communicates between the replaceable lens and the body unit; and
the camera controller resets the timer via the communication pin, wherein the communication pin is capable of being changed between real time communication and non-real time communication.

18. An image forming apparatus comprising a replaceable lens and a body unit in which the replaceable lens is installed, the imaging forming apparatus comprising:
a focus part for changing a focal point location;
a first controller comprising a part for measuring a point of time, wherein the first controller transmits information of location of the focus part to the body unit;
an imaging device for generating an image signal;
a second controller for generating a predetermined timing signal and for interworking of operation of the imaging device and the timing signal; and
a third controller for calculating a focal point location by calculating an estimation value of a focal point for each information of the location of the focus part with respect to the image signal,
wherein the first controller transmits the information of the location of the focus part to the body unit, asynchronously with the timing signal of the second controller.

* * * * *